US012797858B2

(12) United States Patent
Dijkstra et al.

(10) Patent No.: US 12,797,858 B2
(45) Date of Patent: Nov. 17, 2026

(54) EXTRACTION DEVICE ASSEMBLY

(71) Applicants: STELLENBOSCH UNIVERSITY, Western Cape Province (ZA); SOUTH AFRICAN MEDICAL RESEARCH COUNCIL, Cape Town (ZA)

(72) Inventors: Stephan Dijkstra, Western Cape Province (ZA); Grant De Vos Theron, Western Cape Province (ZA); Martinus Johannes Nieuwoudt, Western Cape Province (ZA); Rouxjeane Venter, Western Cape Province (ZA); Robin Mark Warren, Western Cape Province (ZA)

(73) Assignee: Stellenbosch University, Stellenbosch (ZA)

( * ) Notice: Subject to any disclaimer, the term of this patent is extended or adjusted under 35 U.S.C. 154(b) by 275 days.

(21) Appl. No.: 18/691,997

(22) PCT Filed: Sep. 13, 2022

(86) PCT No.: PCT/IB2022/058615
§ 371 (c)(1),
(2) Date: Mar. 14, 2024

(87) PCT Pub. No.: WO2023/042070
PCT Pub. Date: Mar. 23, 2023

(65) Prior Publication Data

US 2024/0382971 A1 Nov. 21, 2024

(30) Foreign Application Priority Data

Sep. 14, 2021 (ZA) ................................ 2021/06784

(51) Int. Cl.
*B01L 9/06* (2006.01)
*B01L 99/00* (2010.01)

(52) U.S. Cl.
CPC ......... *B01L 99/00* (2013.01); *B01L 2200/025* (2013.01); *B01L 2300/0672* (2013.01)

(58) Field of Classification Search
CPC ............... B01L 99/00; B01L 2200/025; B01L 2300/0672; B01L 9/06; B01L 9/527; B01L 2200/027; B01L 2400/0683; B01L 3/5635
See application file for complete search history.

(56) References Cited

U.S. PATENT DOCUMENTS 10,625,261 B2 4/2020 Williams et al.
2014/0087958 A1* 3/2014 Chiang ................ C12Q 1/6876 506/9

(Continued)

FOREIGN PATENT DOCUMENTS

CN 100554921 C * 10/2009 ............... G01N 1/18

OTHER PUBLICATIONS

The International Search Report (ISR) with Written Opinion for PCT/IB2022/058615 dated Nov. 28, 2022, pp. 1-9.

*Primary Examiner* — Fatemeh Esfandiari Nia
(74) *Attorney, Agent, or Firm* — McDonnell Boehnen Hulbert & Berghoff LLP

(57) ABSTRACT

An extraction device assembly for extracting a sample from a sample-containing chamber of a nucleic acid amplification cartridge is provided. The assembly has a cartridge interface forming a receptacle configured to at least partially fit the sample-containing chamber therein. The cartridge interface has an aperture configured to at least partially expose the sample-containing chamber, and a collection interface having an aperture configured to at least partially align with the cartridge interface aperture and with the sample-containing chamber positioned at least partially between them. The collection interface aperture is in fluid communication with a collector. The extraction device assembly is operable to fit (Continued)

the sample-containing chamber in the receptacle of the cartridge interface and guide a piercing tool into the cartridge interface aperture to pierce the sample-containing chamber and liberate a sample contained therein for transferral to the collector.

14 Claims, 33 Drawing Sheets

(56) References Cited

U.S. PATENT DOCUMENTS

| | | | | |
|---|---|---|---|---|
| 2015/0192506 | A1 | 7/2015 | U'Ren et al. | |
| 2018/0163270 | A1* | 6/2018 | Mcdowell-Buchanan | B01L 3/502715 |
| 2022/0155290 | A1* | 5/2022 | Khattak | B01L 3/502715 |
| 2024/0017255 | A1* | 1/2024 | Yu | B01L 7/52 |
| 2024/0218467 | A1* | 7/2024 | Jones | B01L 7/52 |

* cited by examiner

EXTRACTION DEVICE ASSEMBLY

CROSS-REFERENCE TO RELATED APPLICATIONS

The present application is a U.S. national stage entry of PCT/IB2022/058615, filed on Sep. 13, 2022, which claims priority from South African Provisional Patent Application No. 2021/06784, filed on 14 Sep. 2021, the contents of both of which are incorporated by reference.

FIELD OF THE INVENTION

This invention relates to a device for extracting sample material from a nucleic acid amplification cartridge.

BACKGROUND TO THE INVENTION

Nucleic acid amplification is a crucial technique used in the fields of molecular biology, diagnostics, and biotechnology. For example, nucleic acid amplification can be used in diagnostics to detect the presence of pathogens, such as viruses, bacteria and fungi.

A GeneXpert test is a test which utilizes nucleic acid amplification in order to detect the presence of genetic material or organisms of interest. The GeneXpert diagnostic platform is widely used throughout the world, for rapid molecular diagnosis. GeneXpert tests utilize disposable cartridges which are placed into a machine in which nucleic acid amplification takes place. Cartridges are manufactured to be disease-specific, in order to identify and quantify the presence of a specific pathogen of interest and/or detect potential drug-resistance. In use, a sample to be tested is pipetted into the cartridge, after which the cartridge is placed in a GeneXpert™ machine where various reactions, including nucleic acid amplification, take place. These cartridges include a reaction tube, into which an amplified sample is moved so that the presence of a gene of interest may be detected. The cartridges are single use, and following the reaction of the GeneXpert test, the cartridge and the amplified sample are both discarded.

The GeneXpert test is commonly used in diagnostics and for the detection of pathogens in human patients. For example, the GeneXpert is commonly used to detect the presence of *Mycobacterium tuberculosis*, the bacteria responsible for causing tuberculosis (TB) in humans. To diagnose TB using the GeneXpert, a patient provides a sputum sample which is treated with sample reagent and pipetted into the cartridge. The cartridge is then inserted into a GeneXpert machine where nucleic acid amplification and purification takes place. The purified sample is ultimately moved to the reaction tube, where the presence of *M. tuberculosis* and resistance to rifampicin may be detected. If *M. tuberculosis* is detected, it can be confirmed that the patient is indeed positive for TB. The cartridge and resultant fluid are then discarded.

As is often the case with diagnostics, a medical practitioner may need to perform further tests on the patient, for example, to determine the presence of further pathogens, for drug susceptibility testing and for strain typing. As the purified sample is discarded together with the cartridge, the practitioner will then need to ask the patient to return to give further samples. This process wastes time and costs for all parties involved, and may cause delays in treatment planning, which is especially problematic for severely ill patients. Furthermore, asking contagious patients to return to testing facilities provides further risks for spreading communicable diseases to any person in contact with the patient, and a risk to the patient of contracting a further infection from other patients with whom the former will inevitably come into proximity at a clinic.

Additionally, molecular work other than diagnostics, which also utilizes nucleic acid amplification cartridges, could benefit from downstream applications using resultant amplified samples.

Therefore, it would be useful to be able to extract the purified sample from the reaction tube before discarding the cartridge, for use in downstream applications.

Currently, there are no methods used in practice to safely and aseptically extract purified samples from a reaction tube of a GeneXpert cartridge. The applicant believes that there is scope for improvement.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with this invention there is provided an extraction device assembly for extracting a sample from a sample-containing chamber of a nucleic acid amplification cartridge, the assembly comprising:

- a cartridge interface forming a receptacle configured to at least partially fit the sample-containing chamber therein, the cartridge interface having an aperture configured to at least partially expose the sample-containing chamber when fitted in the receptacle; and
- a collection interface having an aperture configured to at least partially align with the cartridge interface aperture with the sample-containing chamber positioned at least partially between the cartridge interface aperture and collection interface aperture when fitted in the receptacle, the collection interface aperture furthermore being in fluid communication with a collector,
- wherein the extraction device assembly is operable to fit the sample-containing chamber in the receptacle of the cartridge interface and guide a piercing tool into the cartridge interface aperture to pierce the sample-containing chamber and liberate a sample contained therein such that the liberated sample is transferred to the collector.

These features may enable a sample-containing chamber of a nucleic acid amplification cartridge to be safely fit into the receptacle, with the apertures being configured to accurately align with the relevant sample-containing chamber to ensure that the liberated sample feeds directly to the collector. This may reduce the likelihood of spillage, which may cause contamination of the environment with genomic material as well as loss of the sample.

In some embodiments, the collector may comprise a tube connector arranged to releasably secure a reaction tube thereto such that the liberated sample feeds directly into and is collected by the reaction tube via the collector. Alternate embodiments may provide for the collector to comprise a collection vessel integrally formed within the cartridge interface, wherein the collection vessel is in fluid communication with the collection interface aperture, or wherein the collection interface aperture forms an opening of the collection vessel.

The cartridge interface and collection interface may be separate parts.

The assembly may include a base configured to enable the cartridge interface and collection interface to be removably secured thereto at assigned securing positions. The base may be configured to be secured to a nucleic acid amplification cartridge, with the securing positions for the cartridge interface and collection interface being positioned such that the sample-containing chamber fits into the receptacle when the base is secured to the cartridge. The base may include at least one claw arranged to grip onto the cartridge when the base is secured to the cartridge.

These features may enable the base to be secured to the cartridge, which may promote safe disposal.

The assembly may include a piercing tool with a tip complementarily shaped to the cartridge interface aperture enabling it to pass there through, and having a shaft with a smaller width than the tip, the tip further shaped to form a complementary fit with the collection interface aperture, wherein the assembly is operable to fit the sample-containing chamber in the receptacle of the cartridge interface, guide the piercing tool through the cartridge interface aperture to pierce the sample-containing chamber and lodge in the collection interface aperture to at least partially conceal the contaminated tip, liberate a sample contained therein such that the liberated sample is collected into the reaction tube, and remove the collection interface and piercing tool lodged therein from the assembly with the shaft of the piercing tool passing through a hole in the cartridge formed by the tip.

These features may enable the piercing tool to pierce the complimentarily shaped sample-containing chamber and then lodge in the collection interface aperture, both concealing the contaminated tip and temporarily plugging the reaction tube. The shaft of the piercing tool having a smaller width may enable it to pass feely through the pierced cartridge and reducing the likelihood of it being contaminated.

The extraction device assembly may be configured to extract a sample from the sample-containing chamber of a GeneXpert™ nucleic acid amplification cartridge. The cartridge interface apertures may be shaped to correspond to a shape and sidewalls of the GeneXpert™ sample-containing reaction chamber that protrudes from the cartridge.

In some embodiments, the cartridge interface apertures may have a substantially rectangular shape, substantially corresponding to a shape of sidewalls of a particular GeneXpert™ nucleic acid amplification cartridge sample-containing reaction chamber, that protrudes from the cartridge and of which the sidewalls have a substantially square shape. The piercing tool may have a substantially pyramid-shaped tip, with the base of the pyramid-shaped tip having a rectangular shape substantially corresponding with that of the GeneXpert™ sample-containing reaction chamber. The term "rectangle" refers to the more generic definition, which includes both unequal adjacent sides, as well as equal adjacent sides (i.e. a square).

The substantially pyramid-shaped tip of the piercing tool may have four faces corresponding to the four sides of the rectangular-shaped base. These four faces may each have a concave surface. This may promote effective liberating of the sample from the sample-containing chamber.

In an alternative embodiment the cartridge interface apertures may have a substantially circular shape, substantially corresponding to a shape of sidewalls of another particular GeneXpert™ nucleic acid amplification cartridge sample-containing reaction chamber, that protrudes from the cartridge and of which the sidewalls have a substantially circular shape. The piercing tool may have a substantially cone-shaped tip, with the base of the cone-shaped tip having a circular shape substantially corresponding with that of the GeneXpert™ sample-containing reaction chamber. The face of the substantially cone-shaped tip of the piercing tool may have a concave surface These features may enable the extraction device to be used with the GeneXpert™ cartridge, with the piercing tool being shaped to breach substantially the entire area of sidewalls of the cartridge, thereby promoting the liberating of the sample. These features may correspond to the shape of the sidewalls of the GeneXpert™ sample-containing reaction chamber that protrudes from the cartridge and may not be limited to a specific shape.

The tube connector may be arranged to releasably secure a microcentrifuge tube thereto. The tube connector may be arranged to releasably secure a PCR tube having a capacity of between 0.1 mL and 0.5 mL, preferably about 0.2 mL.

Embodiments of the invention will now be described, by way of example only, with reference to the accompanying drawings.

DETAILED DESCRIPTION WITH REFERENCE TO THE DRAWINGS

Figure 1:
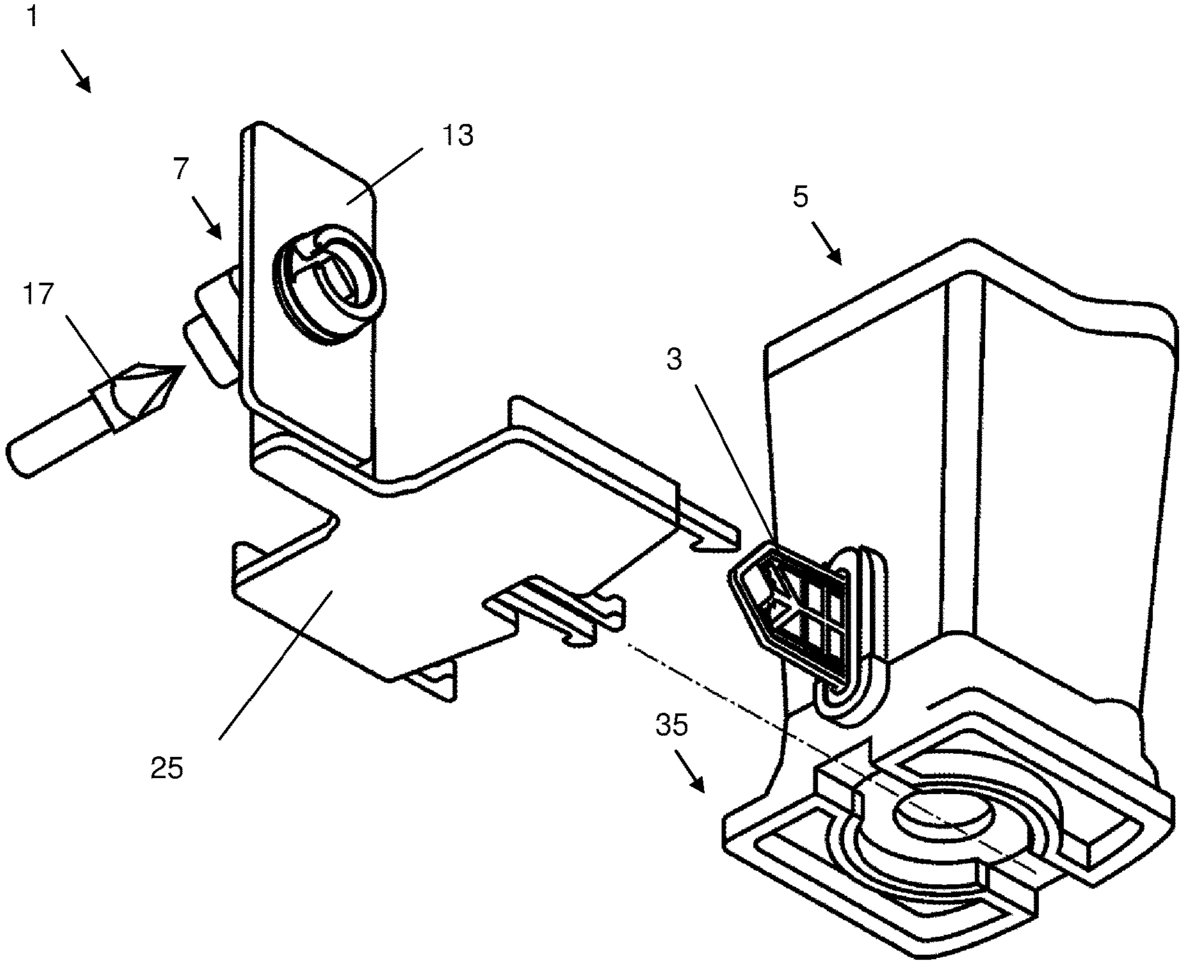
FIG. 1 is a perspective view of an extraction device assembly in use with a nucleic acid amplification cartridge.

An exemplary embodiment of an extraction device assembly is described below. The extraction device assembly finds particular application in the extraction of material from a nucleic acid amplification cartridge. More specifically, extraction of material from a sample-containing chamber of a nucleic acid amplification cartridge, such as a GeneXpert™ nucleic acid amplification cartridge.

The extraction device assembly includes a cartridge interface and a collection interface. The cartridge interface includes a receptacle (or cradle) configured to at least partially fit a sample-containing chamber of a nucleic acid amplification cartridge therein. The cartridge interface includes an aperture which is configured to at least partially expose the sample-containing chamber when it is fitted in the receptacle. That is to say that the aperture allows (at least partial) access to the sample-containing chamber. The collection interface also includes an aperture configured to at least partially align with the cartridge interface aperture, with the sample-containing chamber being positioned at least partially between the cartridge interface aperture and collection interface aperture when fitted in the collection receptacle. The cartridge interface therefore cradles the cartridge such that its sample-containing chamber is sandwiched between the cartridge interface chamber and the collection interface aperture.

The collection interface includes a collector which is configured to be in fluid communication with the sample-containing chamber, via the collection interface aperture. The collection interface aperture is therefore an opening leading to the collector.

The cartridge interface aperture is used to guide a piercing tool to breach at least one wall of the sample-containing chamber and liberate a sample contained therein such that the liberated sample is transferred to the collector. The sample-containing chamber of the GeneXpert™ cartridge, for example, is a substantially rectangular (or square) chamber protruding outward from the main body of the cartridge and having two relatively thin plastic walls with the space between the walls forming a reservoir in which the sample may be contained. When the extraction device assembly is used with the GeneXpert™ cartridge, the cartridge interface aperture is used to guide the piercing tool to breach both walls of the sample-containing chamber and liberate the sample contained therein such that the liberated sample is transferred to the collector.

The collector may comprise a tube connector arranged to releasably secure a reaction tube to the collector, such as a microcentrifuge tube. Once the liberated sample has been collected in the reaction tube, it may therefore be removed from the extraction device assembly and the sample can be used in further applications. Alternate embodiments may provide for the collector to be a collection vessel which is integrally formed with the collection interface. The sample can then be removed from the collection vessel, by means of a pipette, or the like, for use in further applications.

The extraction device assembly may also include a base which enables the extraction device assembly to be secured onto the nucleic acid amplification cartridge. The cartridge interface and the collection interface may be removably secured to the base. The base may include at least one claw arranged to grip onto the cartridge, when the base is secured to the cartridge. The claw or claws may be located at the ends of elongate, tensile arms. As the base is secured to the cartridge, the claws may be forced open, and clamp onto features of the cartridge under the force of the tensile arms.

Furthermore, the extraction device assembly may also include a piercing tool which can be used to pierce the sample-containing chamber, when the cartridge interface and collection interface are fitted onto the cartridge. The piercing tool may be configured to pass through the aperture of the cartridge interface and lodge into the aperture of the collection interface. This may allow the piercing tool to pierce the sample-containing chamber and pass therethrough, whilst blocking the opening of the collection interface so as to maintain a sterile environment within the collector.

The extraction device assembly may therefore be fitted onto the sample-containing chamber of a nucleic acid amplification cartridge. A piercing tool may then be used to puncture at least a part of the sample-containing chamber to liberate a sample contained therein. The liberated sample may then feed directly into the collector. This allows for the aseptic collection of the contents of the sample-containing chamber, for possible use in further downstream applications.

As mentioned above, the extraction device assembly may have particular application for use with a GeneXpert™ nucleic acid amplification cartridge. Therefore, the extraction device assembly may be used to extract a sample contained in a sample-containing chamber of a GeneXpert™ nucleic acid amplification cartridge.

The term "nucleic acid amplification cartridge" used herein refers to a cartridge for use in molecular work. Specifically, it refers to a cartridge into which a sample may be inserted in order to amplify genetic material of interest which may be contained in a sample, by polymerase chain reaction (PCR). Also, the term "sample-containing chamber" of a nucleic acid amplification cartridge used herein refers to an output chamber of a nucleic acid amplification cartridge into which a processed and amplified sample is transferred. This is typically an external chamber of the cartridge, configured to be relatively thin in shape, with thin walls.

Embodiments of the invention will now be described with reference to the accompanying drawings, by way of example only.

FIG. 1 shows an embodiment of an extraction device assembly (1) together with a nucleic acid amplification cartridge (5). The extraction device assembly (1) comprises a cartridge interface (7) and a collection interface (13). The nucleic acid amplification cartridge (5) includes sample-containing chamber (3).

As shown in FIG. 1, the cartridge interface (7) includes a cartridge interface aperture (11) and a receptacle (9). The receptacle (9) is configured to allow the sample-containing chamber (3) of the nucleic acid amplification cartridge (5) to be fitted or cradled therein. When the sample-containing chamber (3) is fitted into the receptacle (9), the cartridge interface aperture (11) aligns with the sample-containing chamber (3) to at least partially expose the sample-containing chamber (3). This allows access to the sample containing chamber (3) so that a piercing tool (17) can be inserted into the cartridge interface aperture (11) to at least partially break a portion of the sample-containing chamber (3) to release or liberate at least some of the contents therein.

Figure 5:
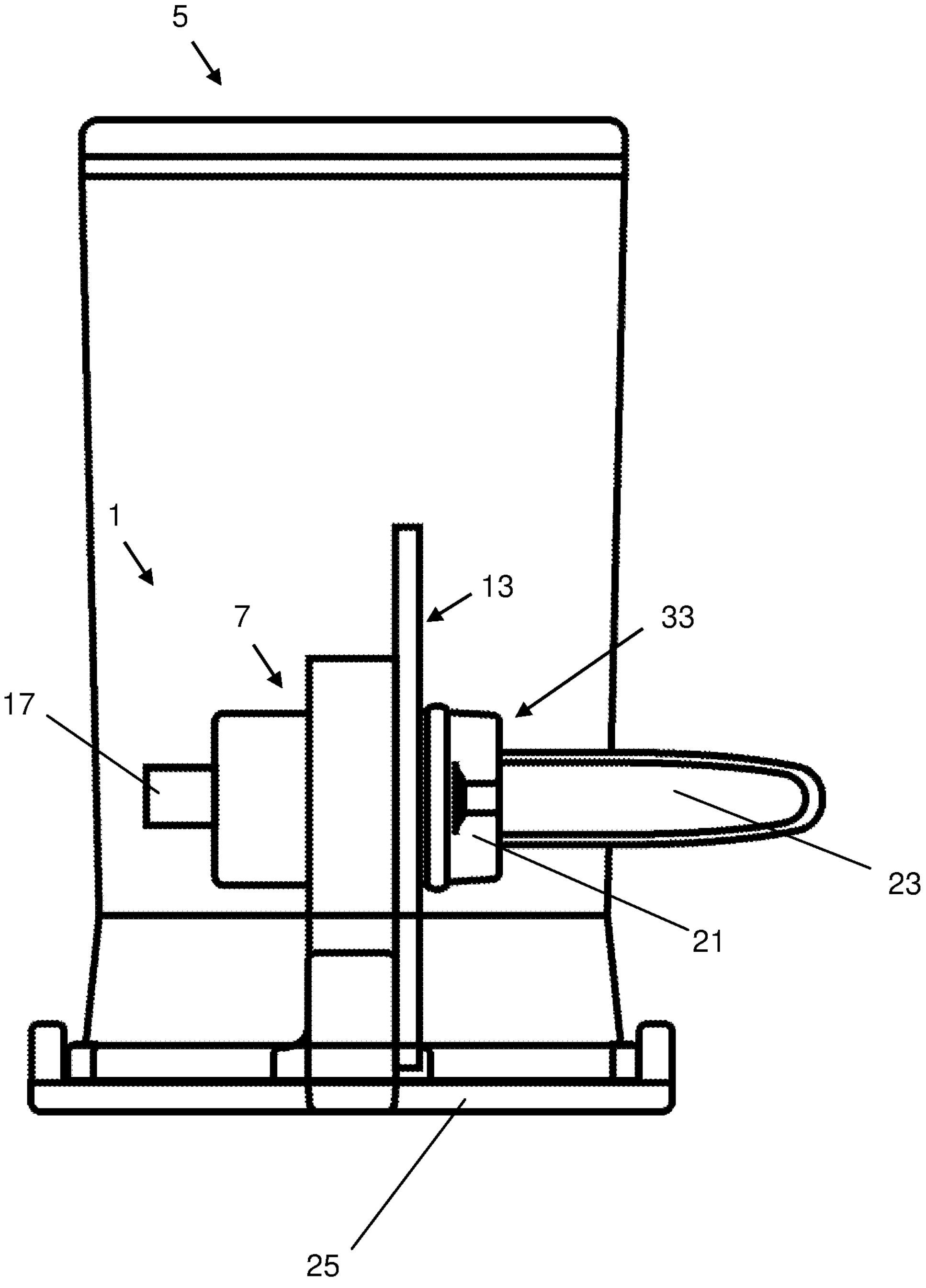
FIG. 5 is a front view of the extraction device assembly of FIG. 3.
Figure 6:
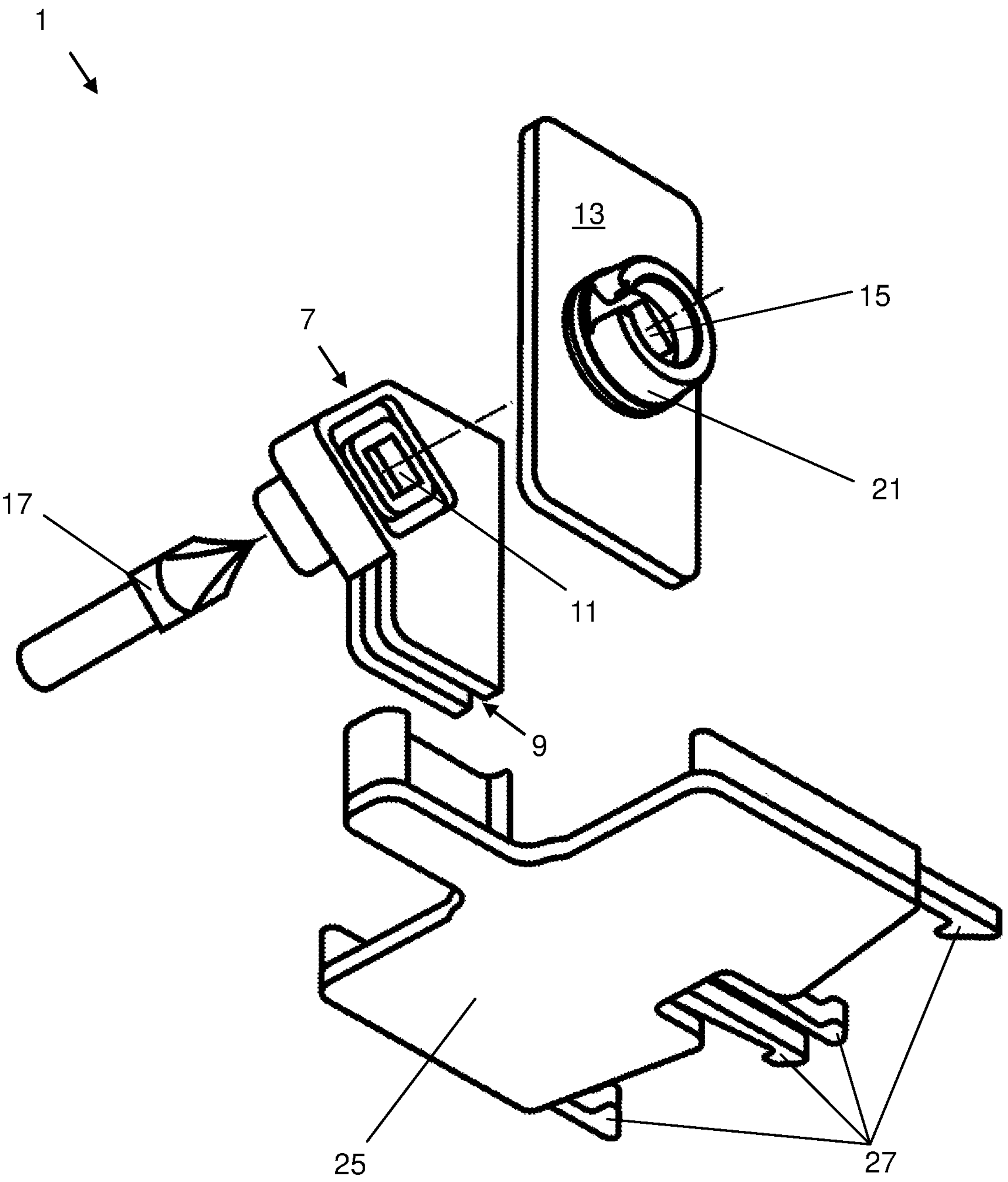
FIG. 6 is an exploded view of the extraction device assembly of FIG. 1.
Figure 7:
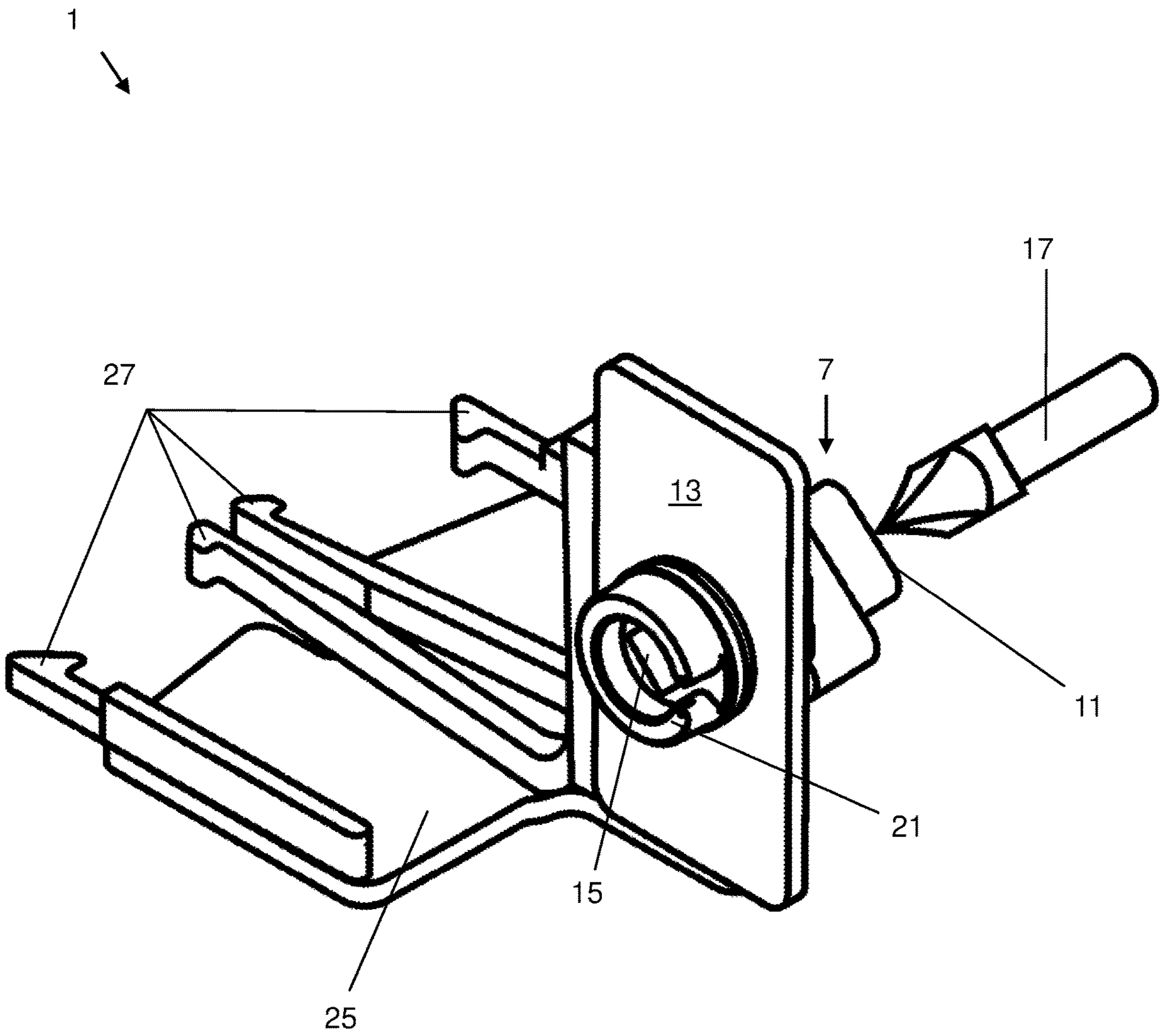
FIG. 7 is a perspective view of the extraction device assembly of FIG. 1.
Figure 8:
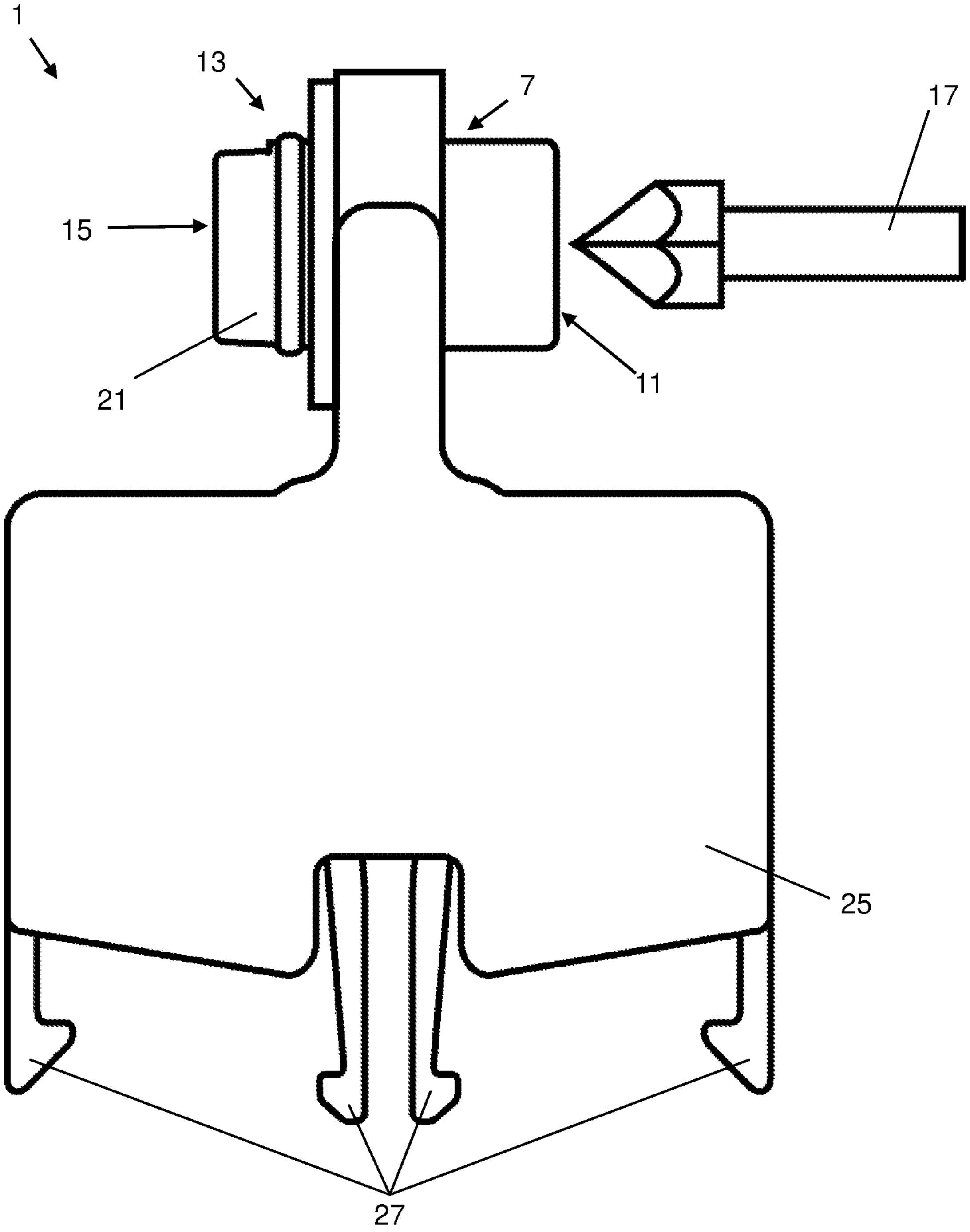
FIG. 8 is a bottom view of the extraction device assembly of FIG. 1.
Figure 9:
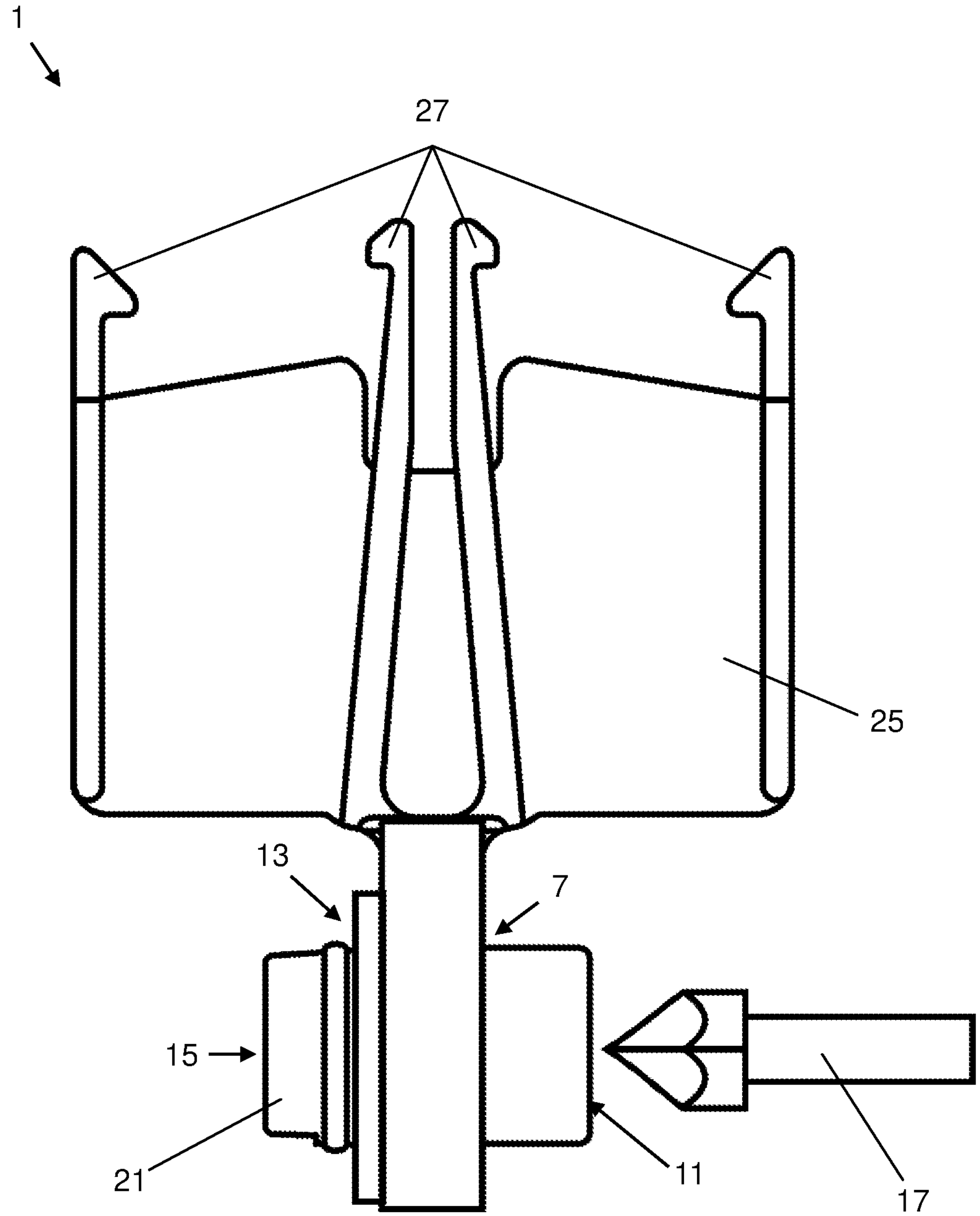
FIG. 9 is a top view of the extraction device assembly of FIG. 1.
Figure 10:
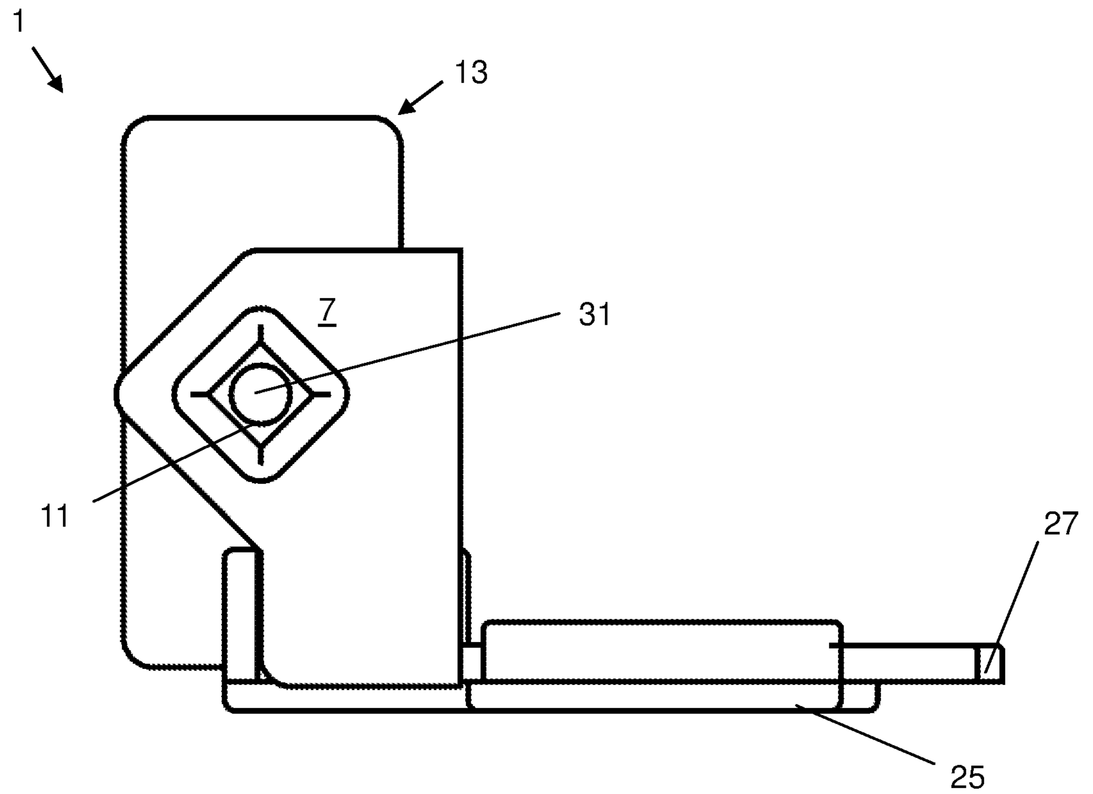
FIG. 10 is a first side view of the extraction device assembly of FIG. 1.

As is also shown in FIGS. 5 and 6, the collection interface (13) includes a collection interface aperture (15) and a collector (33). In this embodiment, the collector (33) comprises a tube connector (21) to which a reaction tube (23) can be connected.

Figure 2:
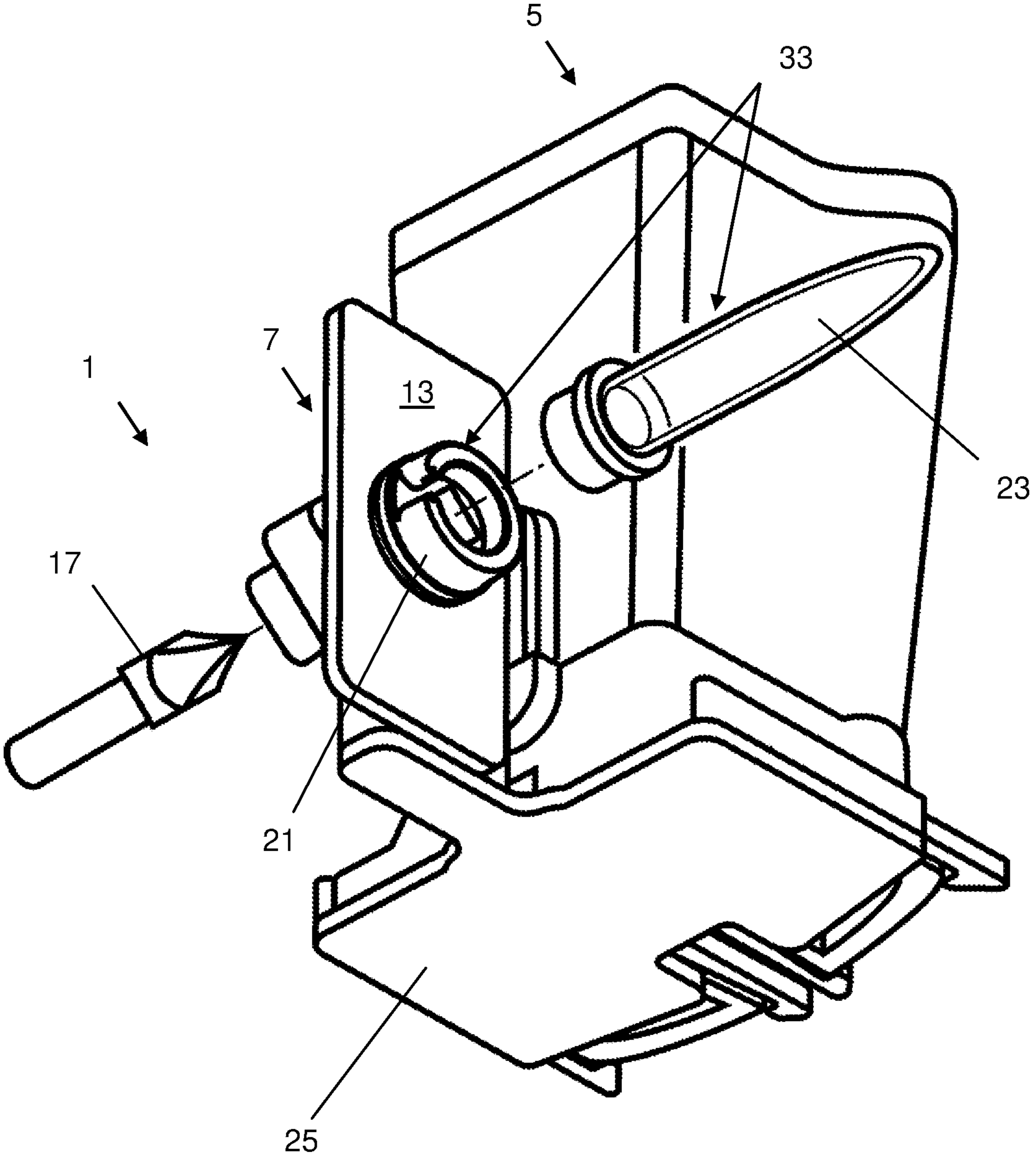
FIG. 2 is a perspective view of the extraction device assembly of FIG. 1, in use in a first, unpierced configuration.
Figure 3:
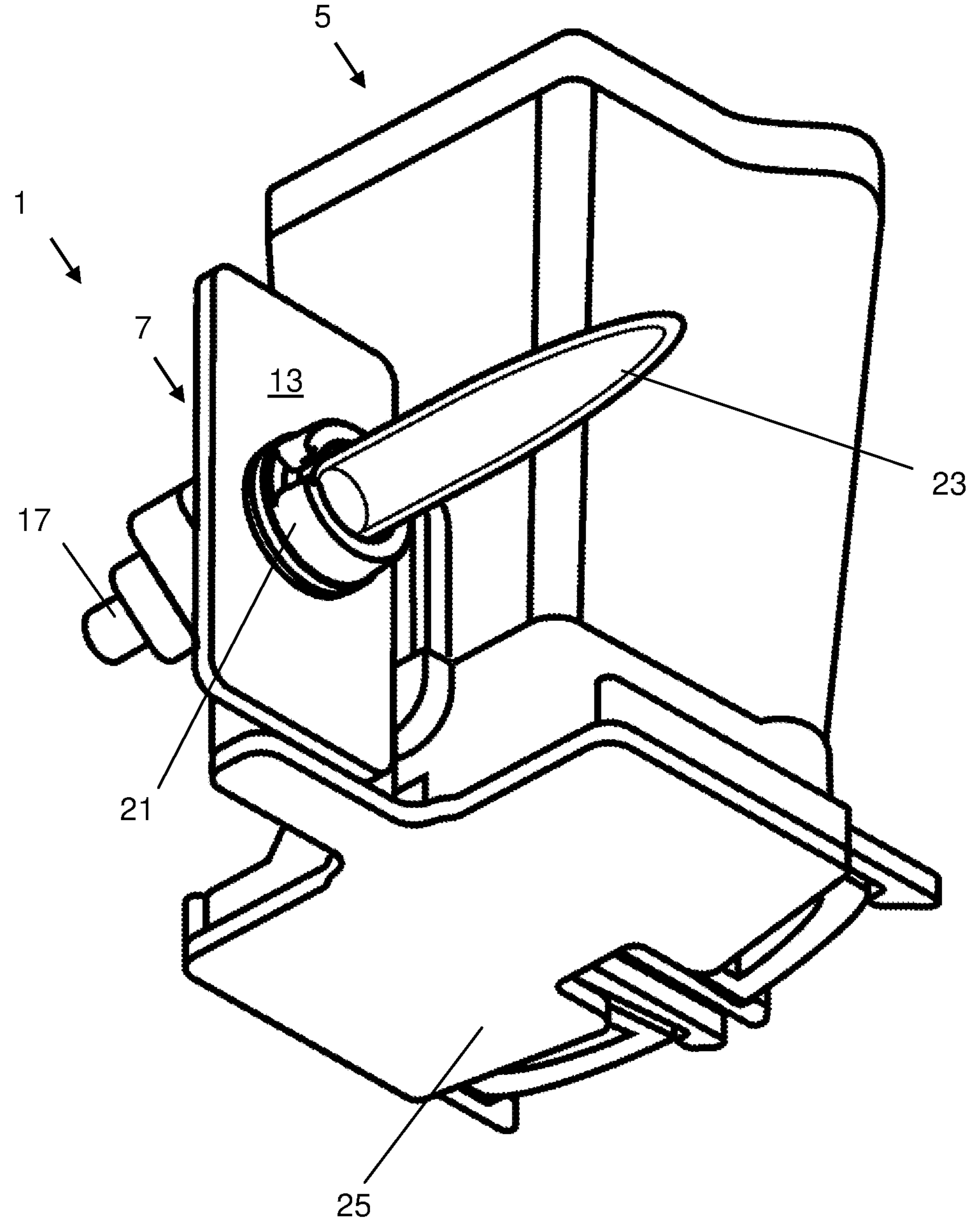
FIG. 3 is a perspective view of the extraction device assembly of FIG. 1, in use in a second, pierced configuration.

As is shown in FIGS. 2 and 3, the reaction tube (23) may be a microcentrifuge tube. More specifically, the microcentrifuge tube may be an Eppendorf™ tube. The reaction tube (23) may optimally be a PCR tube having a capacity of between 0.1 mL and 0.5 mL, preferably about 0.2 mL. In alternate embodiments (not shown), the collector (33) may comprise a collection vessel which is integrally formed with the collection interface.

As shown in FIGS. 1, 5 and 6, the collection interface aperture (15) is configured to align with the cartridge interface aperture (11) on one side, and the collector (33) on the other. Therefore, the sample-containing chamber (3) is sandwiched such that there is a continuous connection between the cartridge interface aperture (11), the sample-containing chamber (3), the tube connector (21) and the reaction tube (23).

As shown in FIG. 6, the cartridge interface (7) and the collection interface (13) are separate components of the extraction device assembly (1), which may be assembled together in use. This is best illustrated in FIGS. 21 to 27, which illustrate the cartridge interface (7) separate from the rest of the extraction device assembly (1), and FIGS. 28 to 34, which illustrate only the collection interface (13). This means that these two separate components may be manufactured separately and may also be separated prior, during or after use.

The extraction device assembly (1) in FIG. 1 also includes a base (25) which allows the cartridge interface (7) and the collection interface (13) to be removably secured thereto at assigned securing positions.

As is shown in FIG. 1, the base (25) is configured to be secured to the nucleic acid amplification cartridge (5). More specifically, the base (25) is configured to connect to the operatively lower portion, or "foot" (35) of the nucleic acid amplification cartridge (5). As is indicated in FIGS. 6 to 9, the base (25) includes claws (27) which are configured to grip onto the nucleic acid amplification cartridge (5) when the base (25) is secured thereto. In this embodiment, the base (25) includes four claws (27) which are arranged at varying intervals on one side of the base (25). These claws (27) include a hook-like appendage at the ends of elongate tensile arms which allow the base (25) to be securely locked onto the cartridge (5). Other embodiments may provide for fewer or more claws on the base. Alternate means of securing the base to the cartridge may also be included, either together with the claw(s) or in place of the claw(s).

The base (25) is also a separate component of the extraction device assembly (1). This is best illustrated in FIGS. 14 to 20, which illustrate only the base (25).

After use, a nucleic acid amplification cartridge is typically disposed of. The claw arrangement of the base allows for the convenient and safe disposal of both the extraction device assembly, or at least certain components thereof (such as the base), together with the nucleic acid amplification cartridge.

The extraction device assembly (1) includes a piercing tool (17), as is illustrated in FIGS. 1 to 13. The piercing tool (17) includes a tip (29) attached to a shaft (31). The tip (29) is complementarily shaped to the cartridge interface aperture (11) (with slightly smaller dimensions) enabling it to pass therethrough. The shaft (31) has a width smaller than that of the tip (29). The tip (29) is further shaped to form a complementary fit with the collection interface aperture (15), (with slightly larger dimensions) such that the tip (29) may be lodged therein to form a seal of the collection interface aperture (15), and subsequently the reaction tube (23).

As is shown in FIGS. 35 to 39, the tip (29) of the piercing tool (17) is formed by a pyramid-like shape, having four faces and a rectangular or square base. In this embodiment, the faces of the pyramid are concave, which may promote effective liberating of a sample from the sample-containing chamber (3).

Therefore, when the sample-containing chamber (3) is fit into the receptacle (9) of the cartridge interface (7), the piercing tool (17) is pushed into the cartridge interface aperture (11) by hand and guided through the cartridge interface aperture (11) to breach at least one wall of the sample-containing chamber (3) through the force applied by an operator's hand on back of the piercing tool shaft (31). Optimally, as is the case in this embodiment, the piercing tool (17) will bisect a width of the sample-containing chamber (3) to liberate the sample contained therein. At least some of the sample will then flow into the reaction tube (23), via the collection interface aperture (15). The tip (29) of the piercing tool (17) will then be lodged into the collection interface aperture (15) so that the contaminated tip (29) is at least partially concealed therein. The collection interface (13) can then be removed from the rest of the extraction device assembly (1), together with the piercing tool (17) lodged therein. The liberated sample will therefore be securely held within the reaction tube (23).

Figure 4:
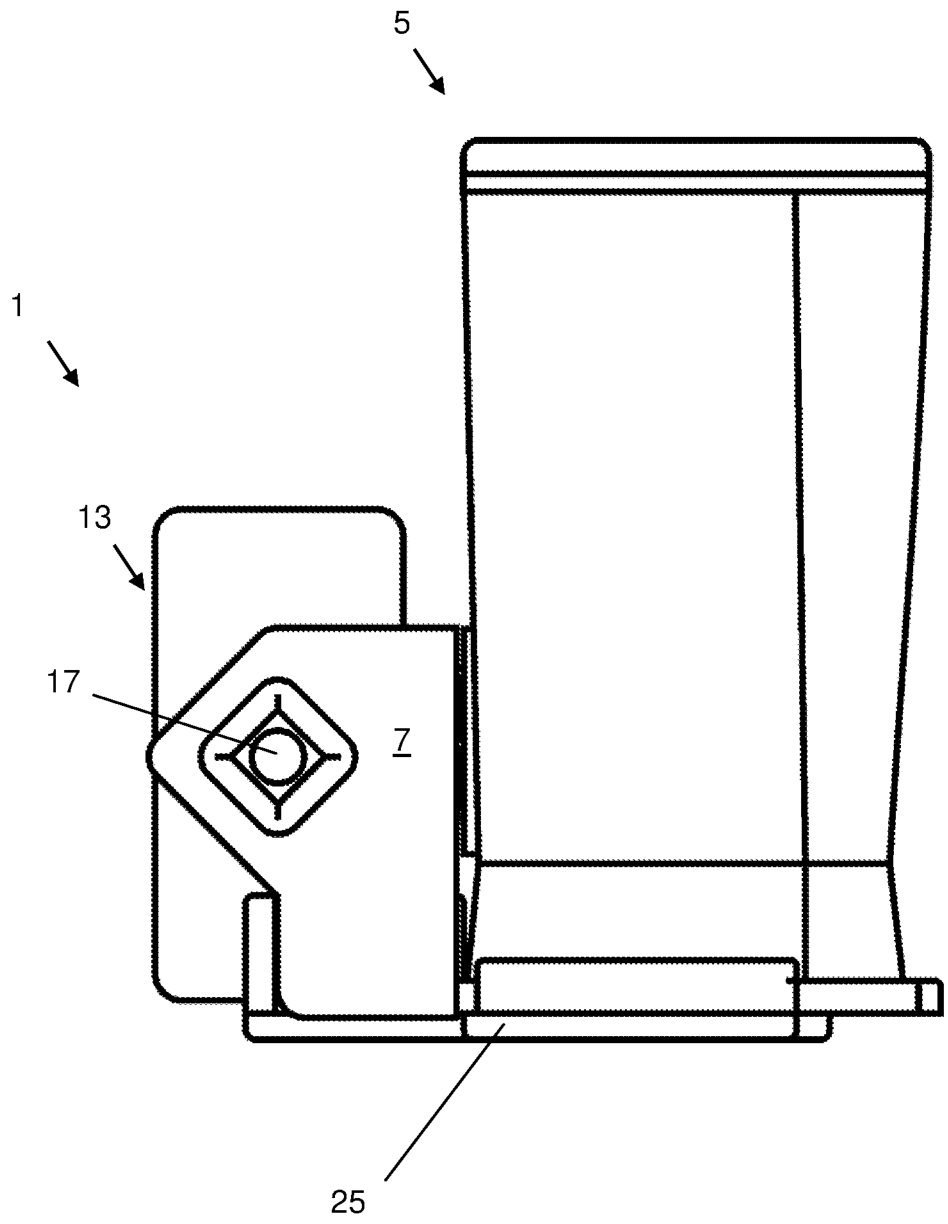
FIG. 4 is a side view of the extraction device assembly of FIG. 3.
Figure 11:
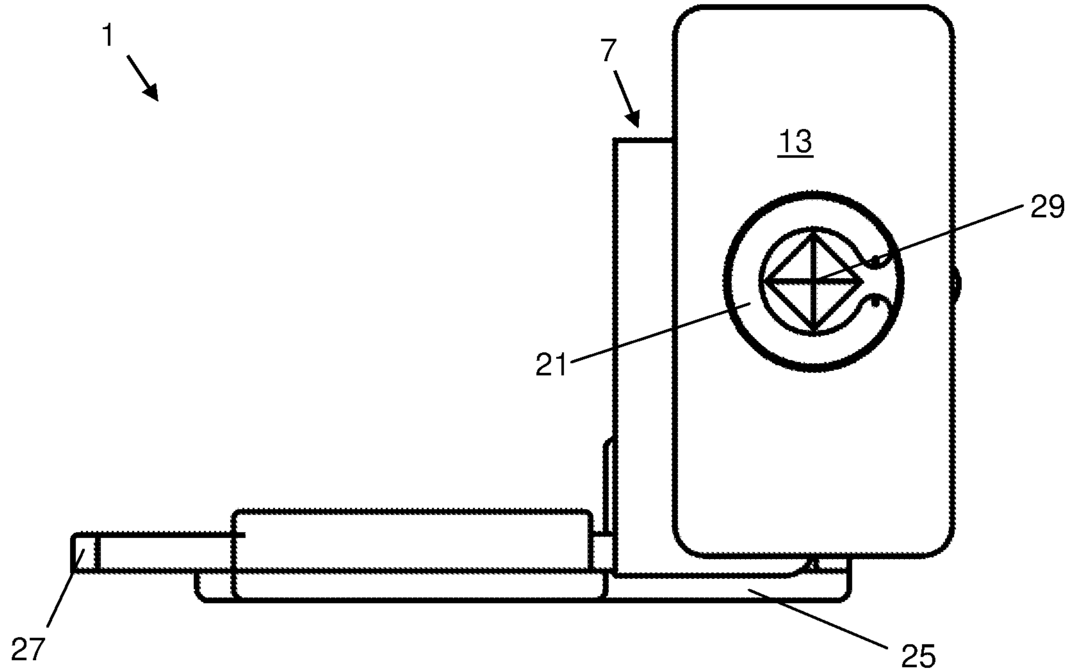
FIG. 11 is a second side view of the extraction device assembly of FIG. 1.
Figure 12:
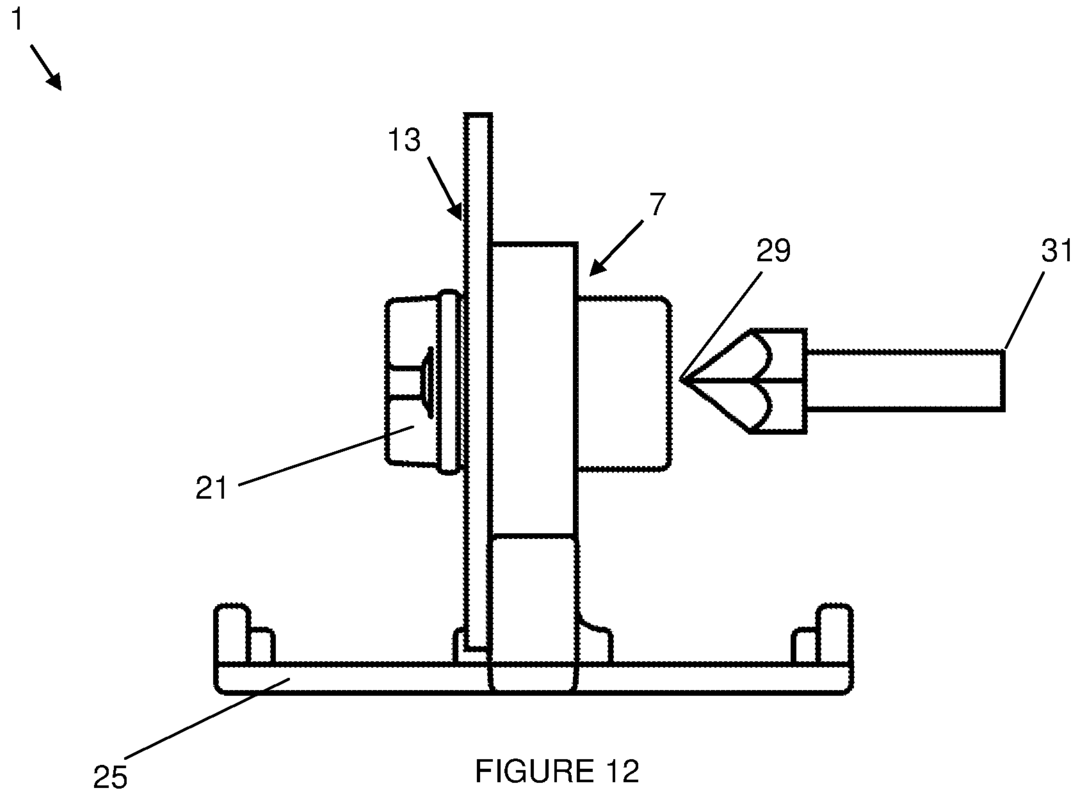
FIG. 12 is a front view of the extraction device assembly of FIG. 1.
Figure 13:
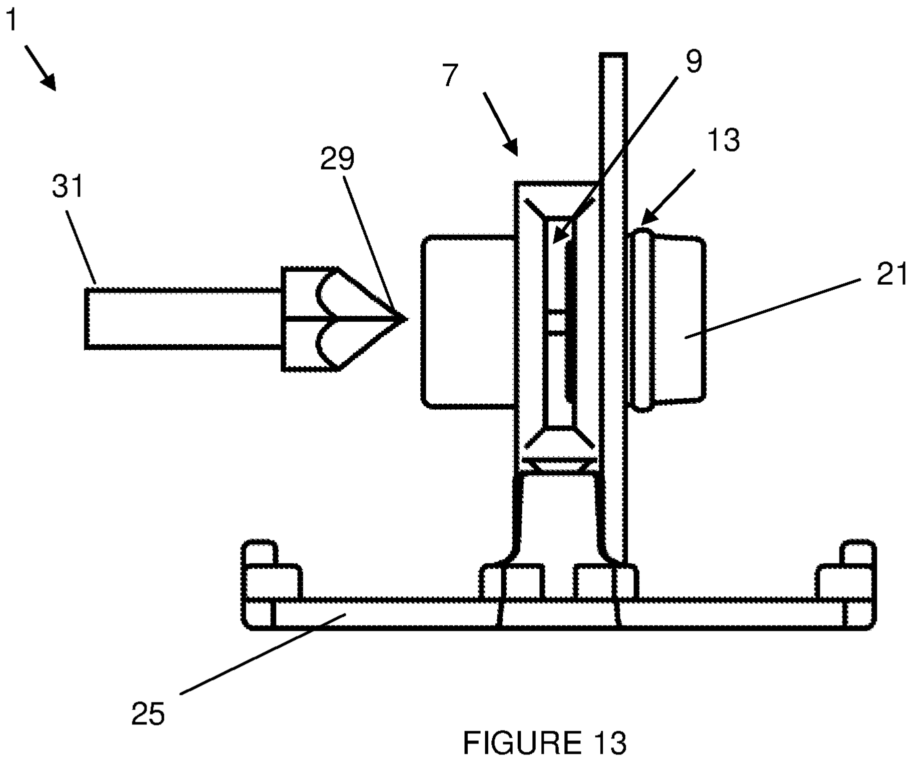
FIG. 13 is a rear view of the extraction device assembly of FIG. 1.
Figure 14:
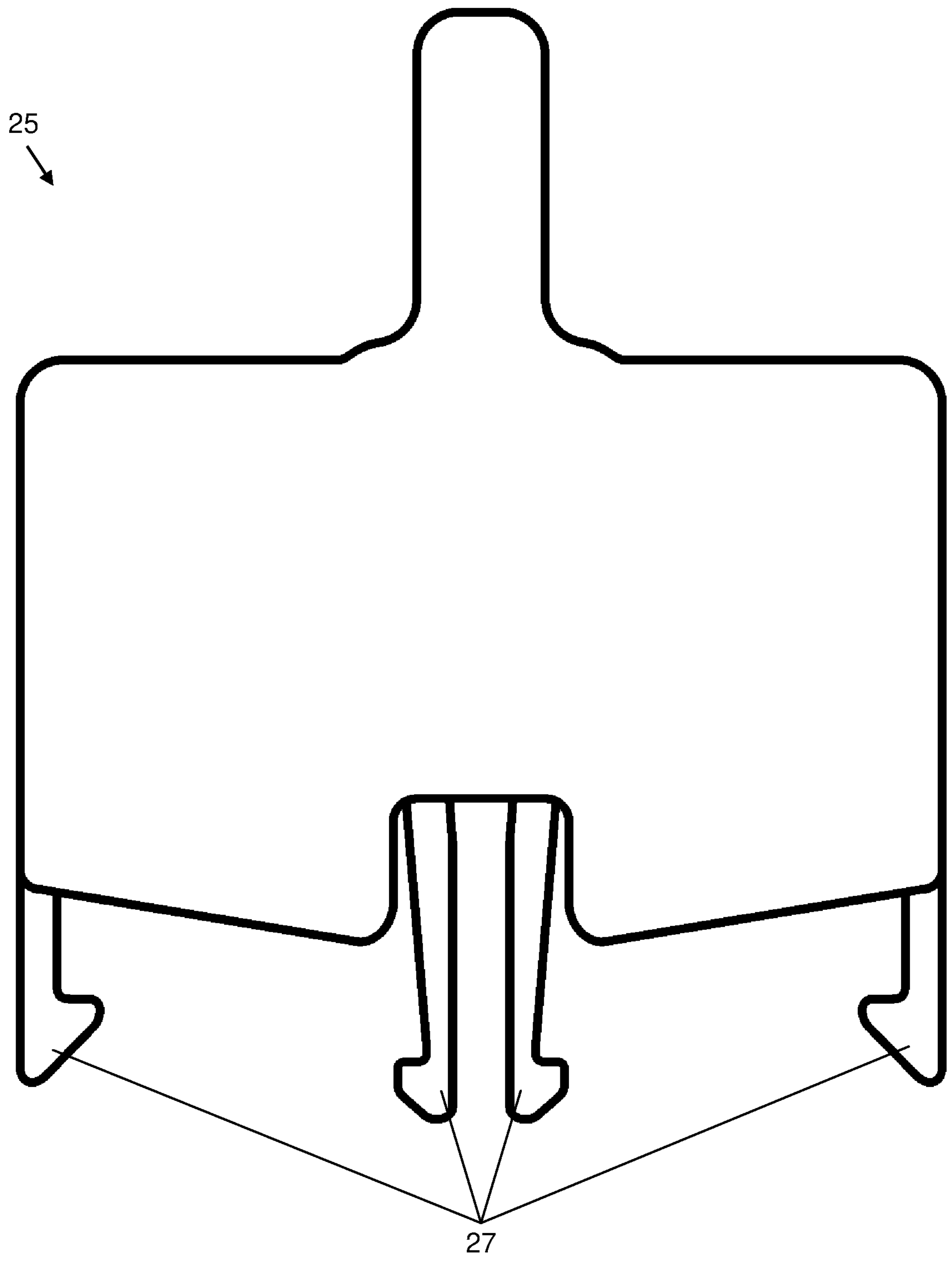
FIG. 14 is a bottom view of a base of the extraction device assembly of FIG. 1.
Figure 15:
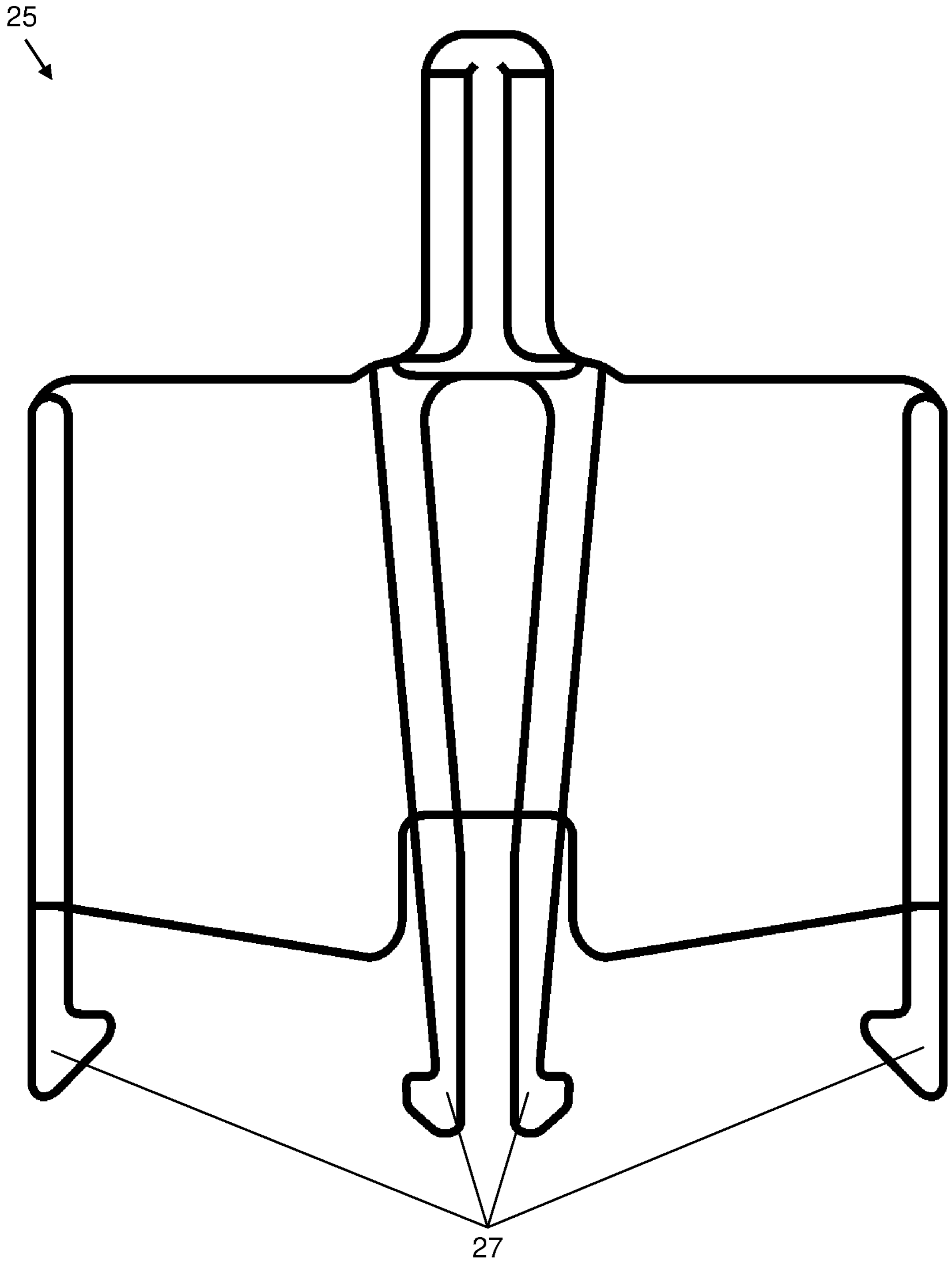
FIG. 15 is a top view of a base of the extraction device assembly of FIG. 1.
Figure 16:
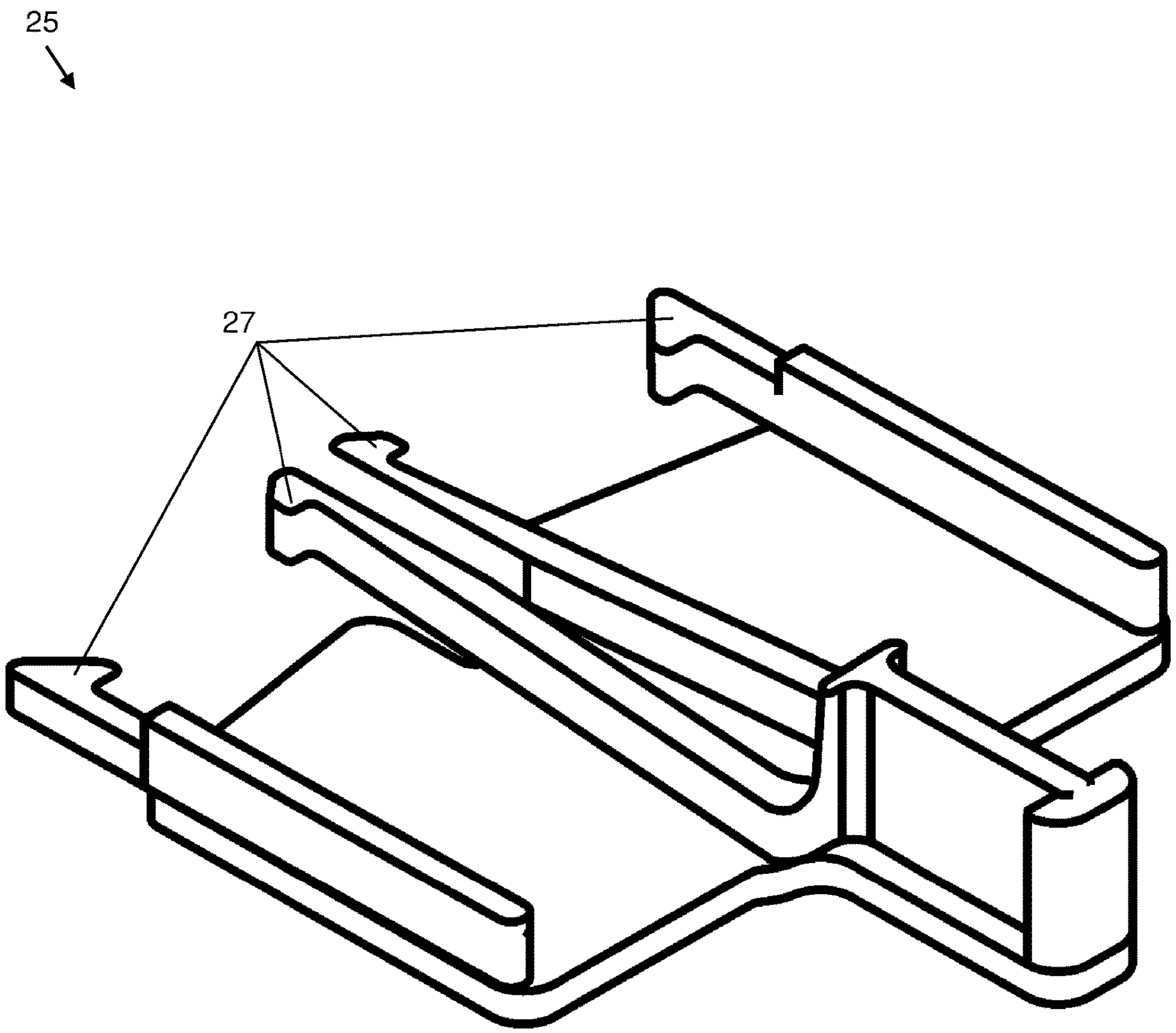
FIG. 16 is a perspective view of a base of the extraction device assembly of FIG. 1.
Figure 17:
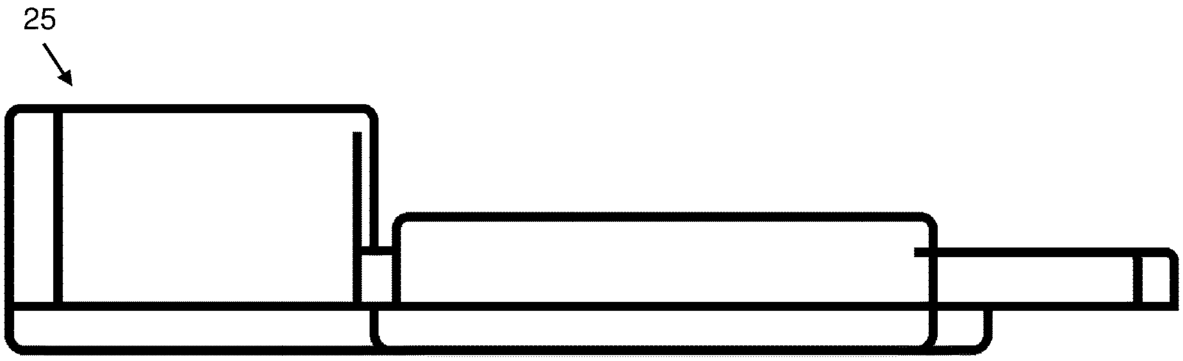
FIG. 17 is a first side view of a base of the extraction device assembly of FIG. 1.
Figure 18:
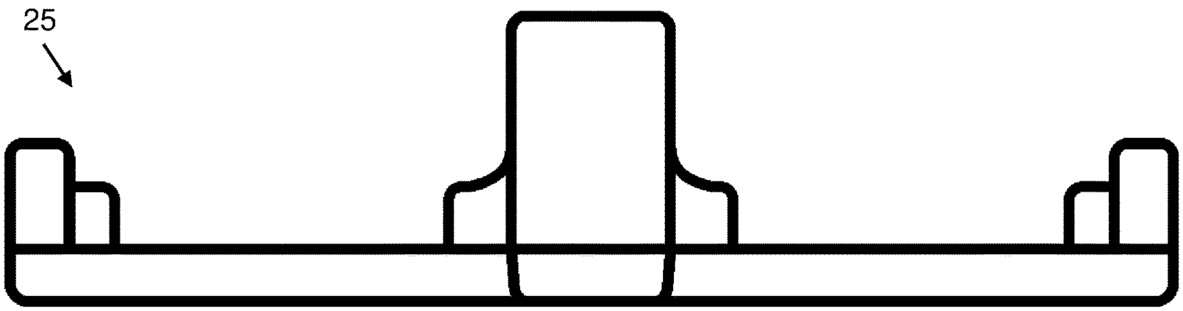
FIG. 18 is a rear view of a base of the extraction device assembly of FIG. 1.
Figure 19:
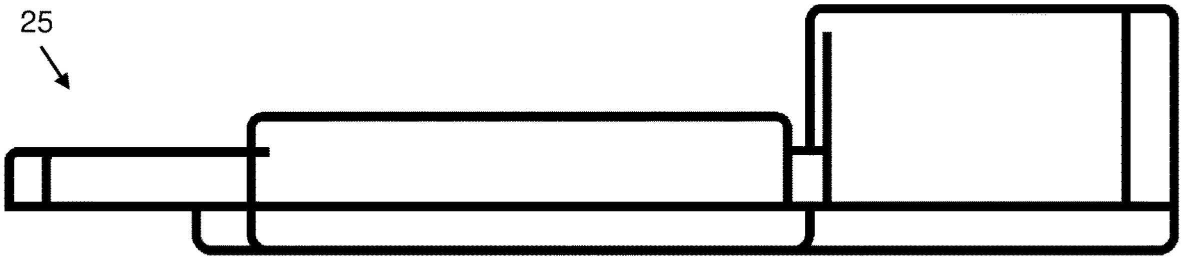
FIG. 19 is a second side view of a base of the extraction device assembly of FIG. 1.
Figure 20:
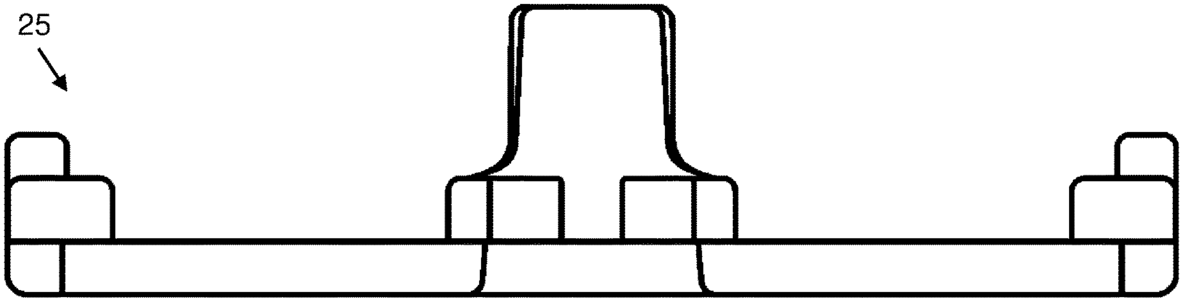
FIG. 20 is a front view of a base of the extraction device assembly of FIG. 1.
Figure 21:
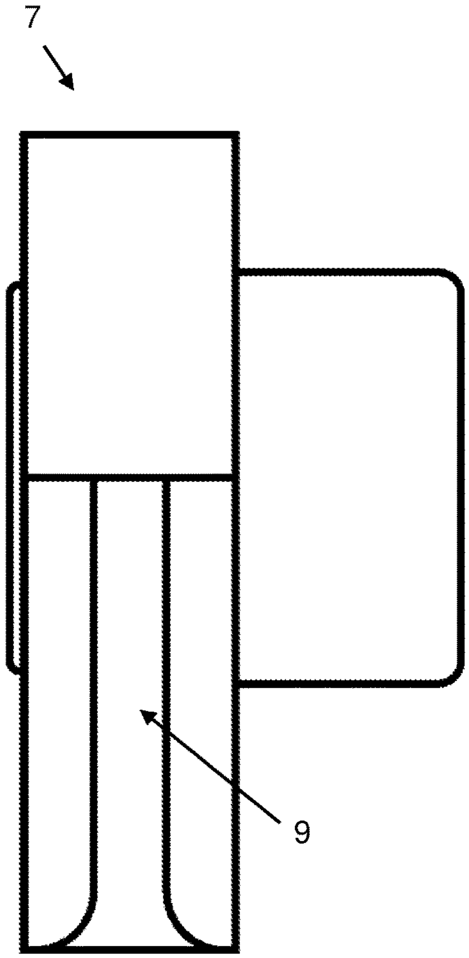
FIG. 21 is a rear view of a cartridge interface of the extraction device assembly of FIG. 1.
Figure 22:
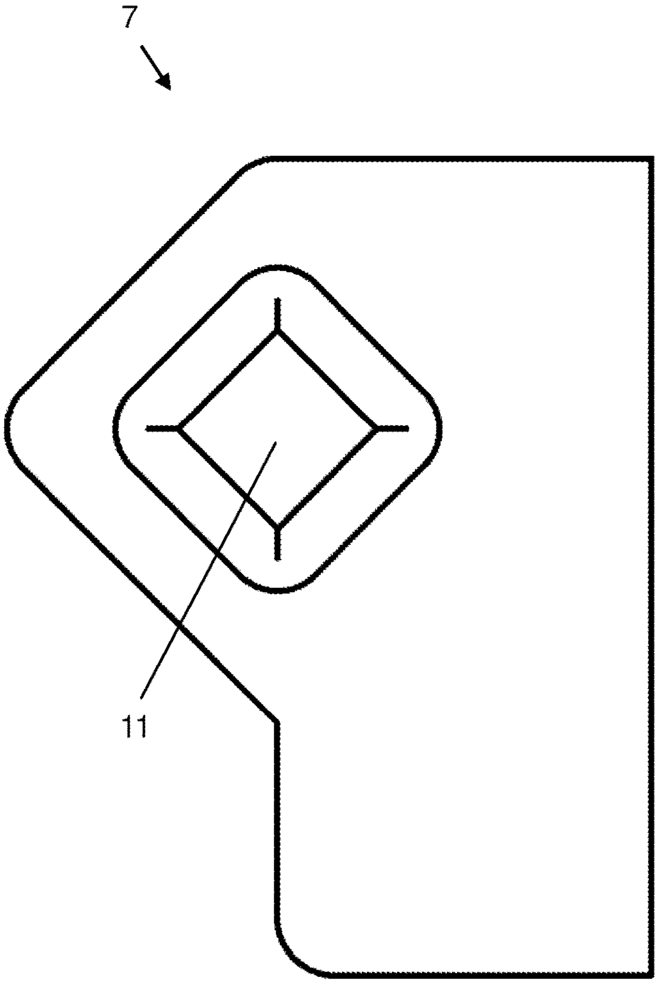
FIG. 22 is a first side view of a cartridge interface of the extraction device assembly of FIG. 1.
Figure 23:
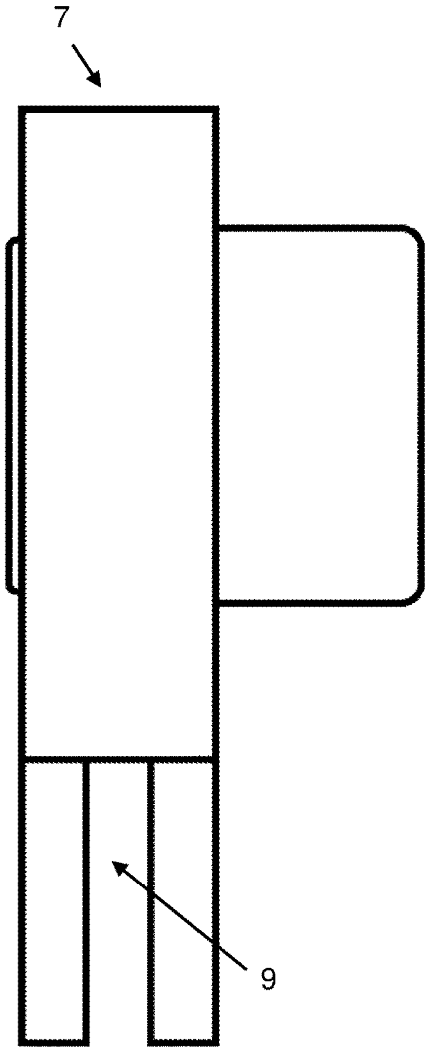
FIG. 23 is a front view of a cartridge interface of the extraction device assembly of FIG. 1.
Figure 24:
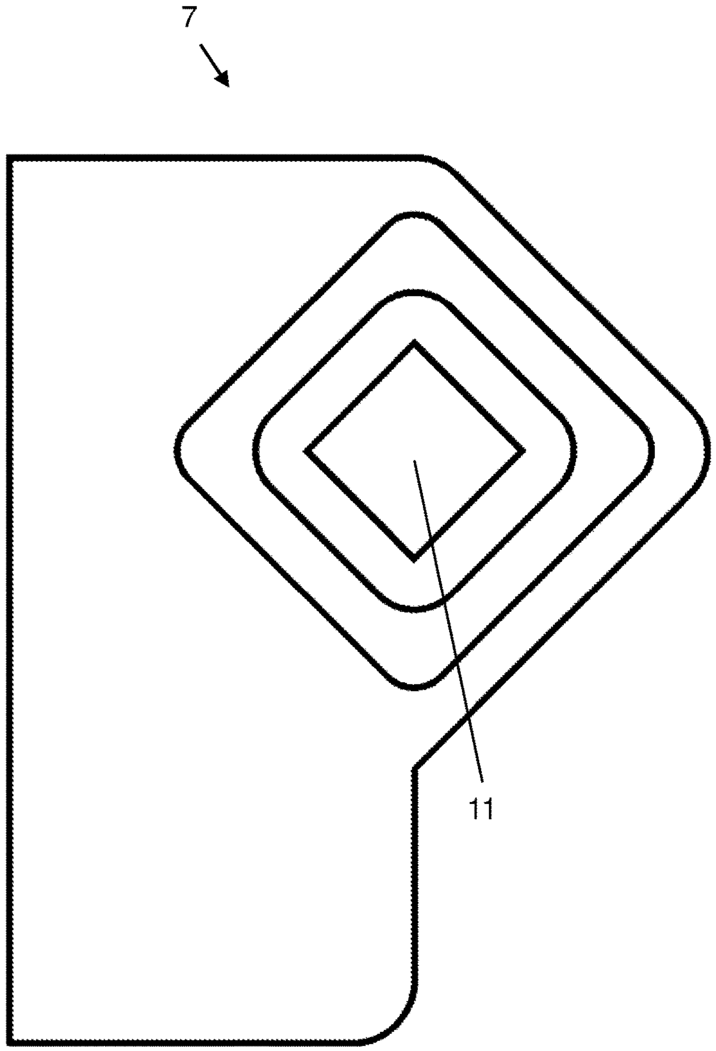
FIG. 24 is a second side view of a cartridge interface of the extraction device assembly of FIG. 1.
Figure 25:
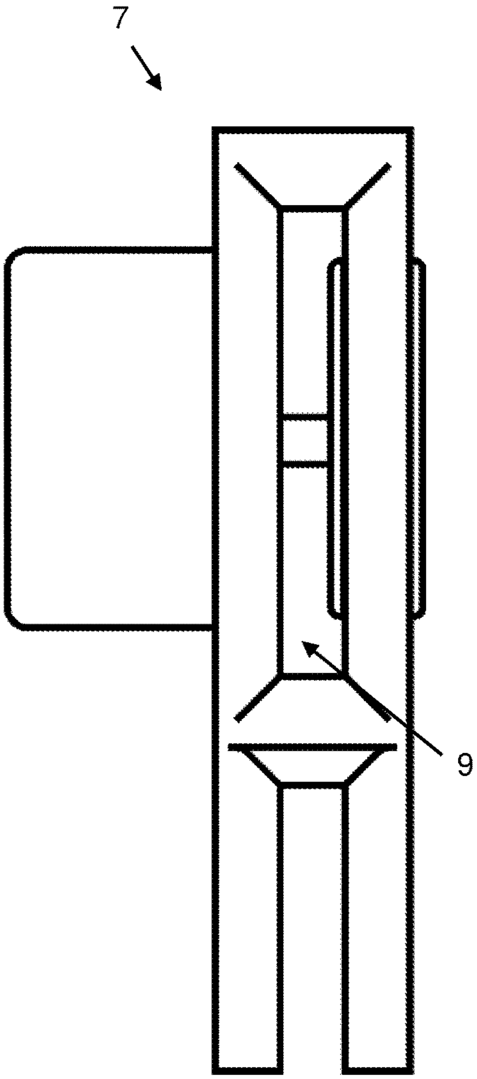
FIG. 25 is a bottom view of a cartridge interface of the extraction device assembly of FIG. 1.
Figure 26:
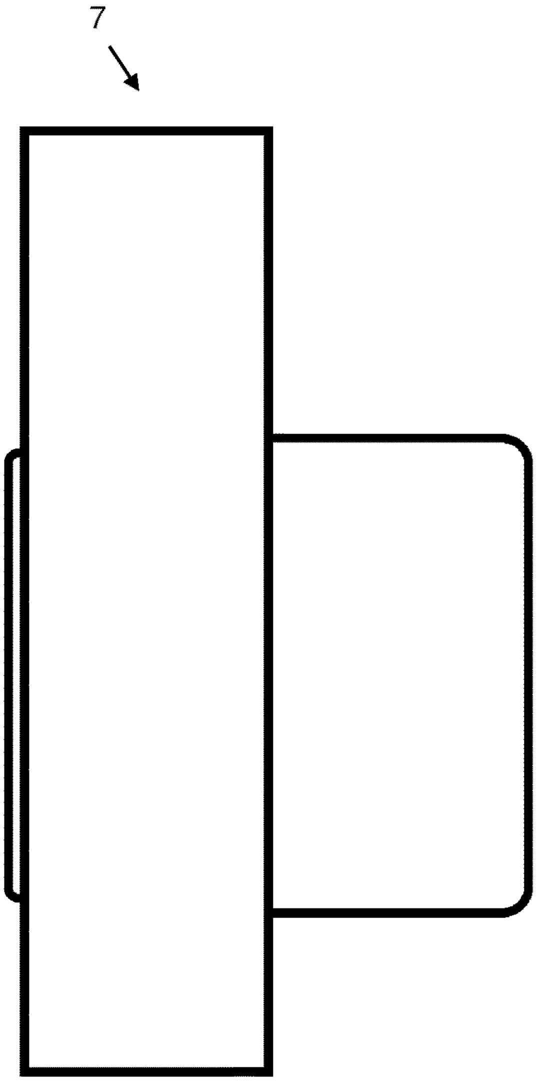
FIG. 26 is a top view of a cartridge interface of the extraction device assembly of FIG. 1.
Figure 27:
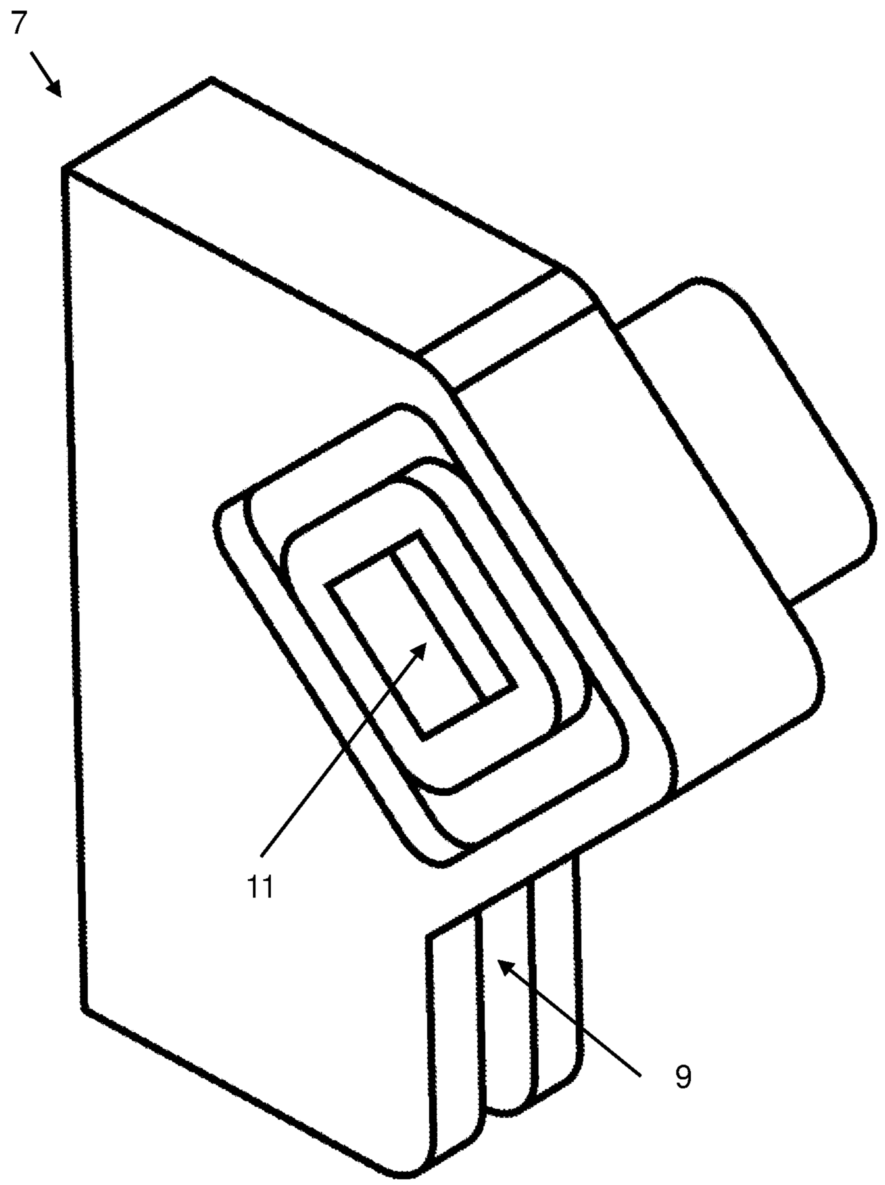
FIG. 27 is a perspective view of a cartridge interface of the extraction device assembly of FIG. 1.
Figure 28:
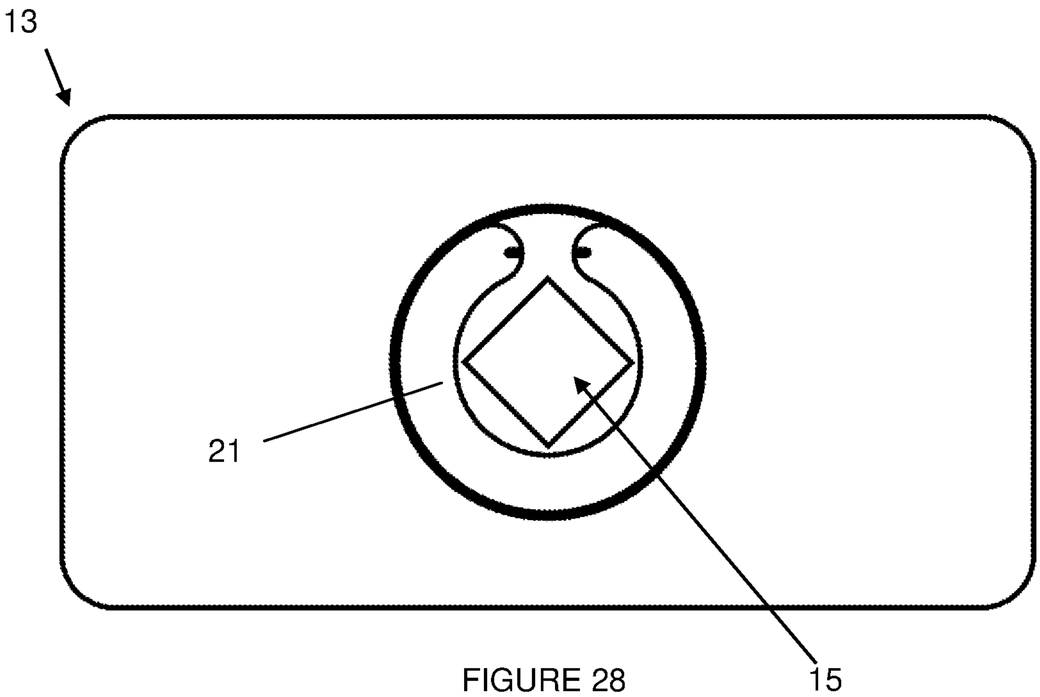
FIG. 28 is a front view of a collection interface of the extraction device assembly of FIG. 1.
Figure 29:
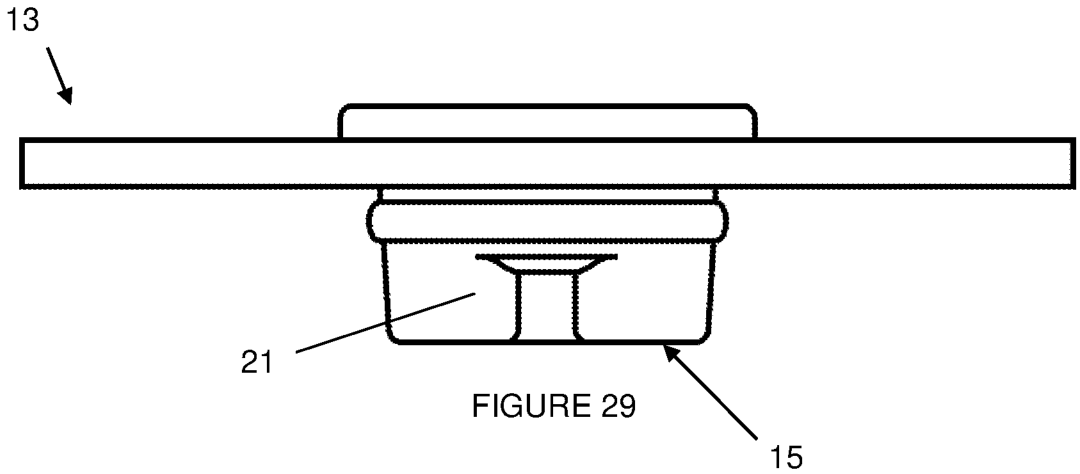
FIG. 29 is a first side view of a collection interface of the extraction device assembly of FIG. 1.
Figure 30:
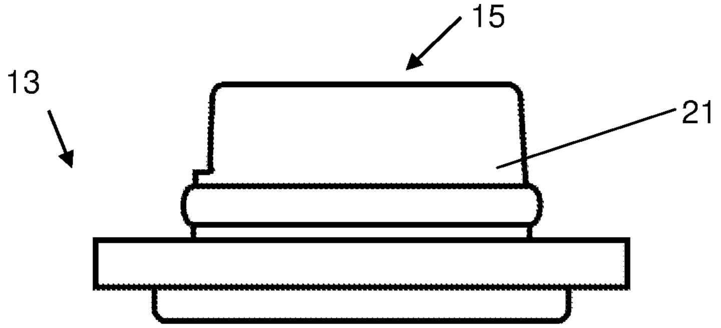
FIG. 30 is a top view of a collection interface of the extraction device assembly of FIG. 1.
Figure 31:
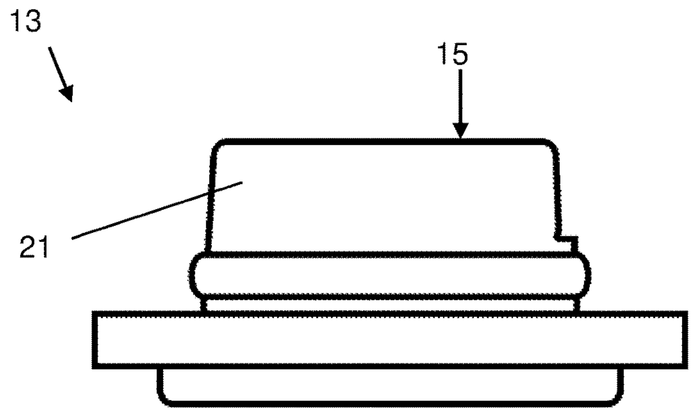
FIG. 31 is a bottom view of a collection interface of the extraction device assembly of FIG. 1.
Figure 32:
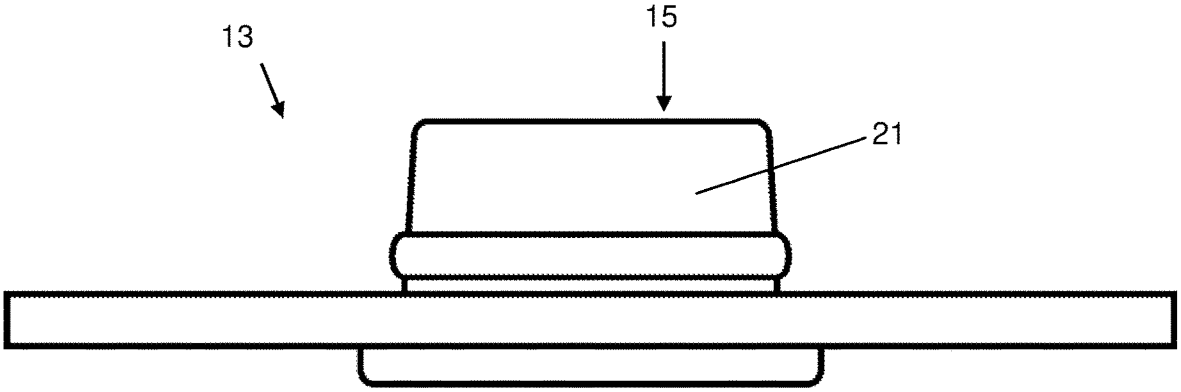
FIG. 32 is a second side view of a collection interface of the extraction device assembly of FIG. 1.
Figure 33:
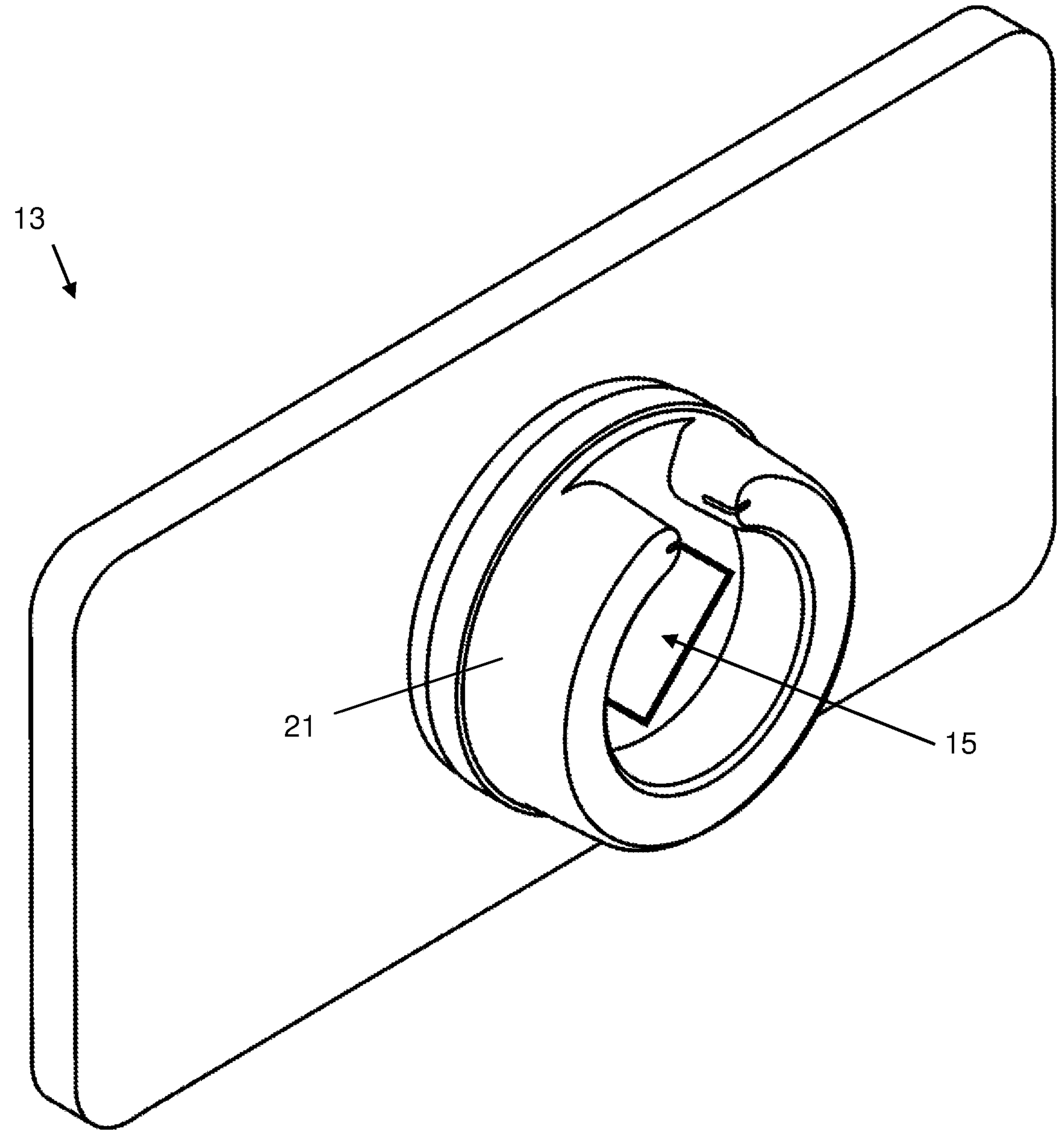
FIG. 33 is a perspective view of a collection interface of the extraction device assembly of FIG. 1.
Figure 34:
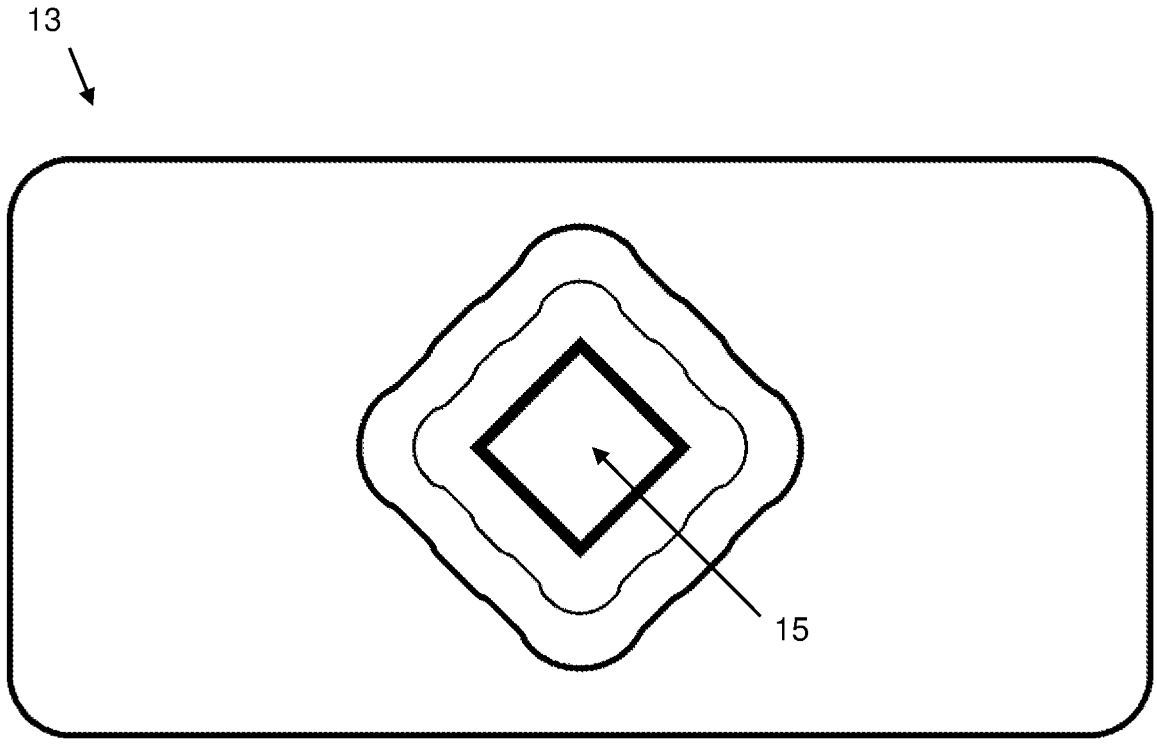
FIG. 34 is a rear view of a collection interface of the extraction device assembly of FIG. 1.
Figure 35:
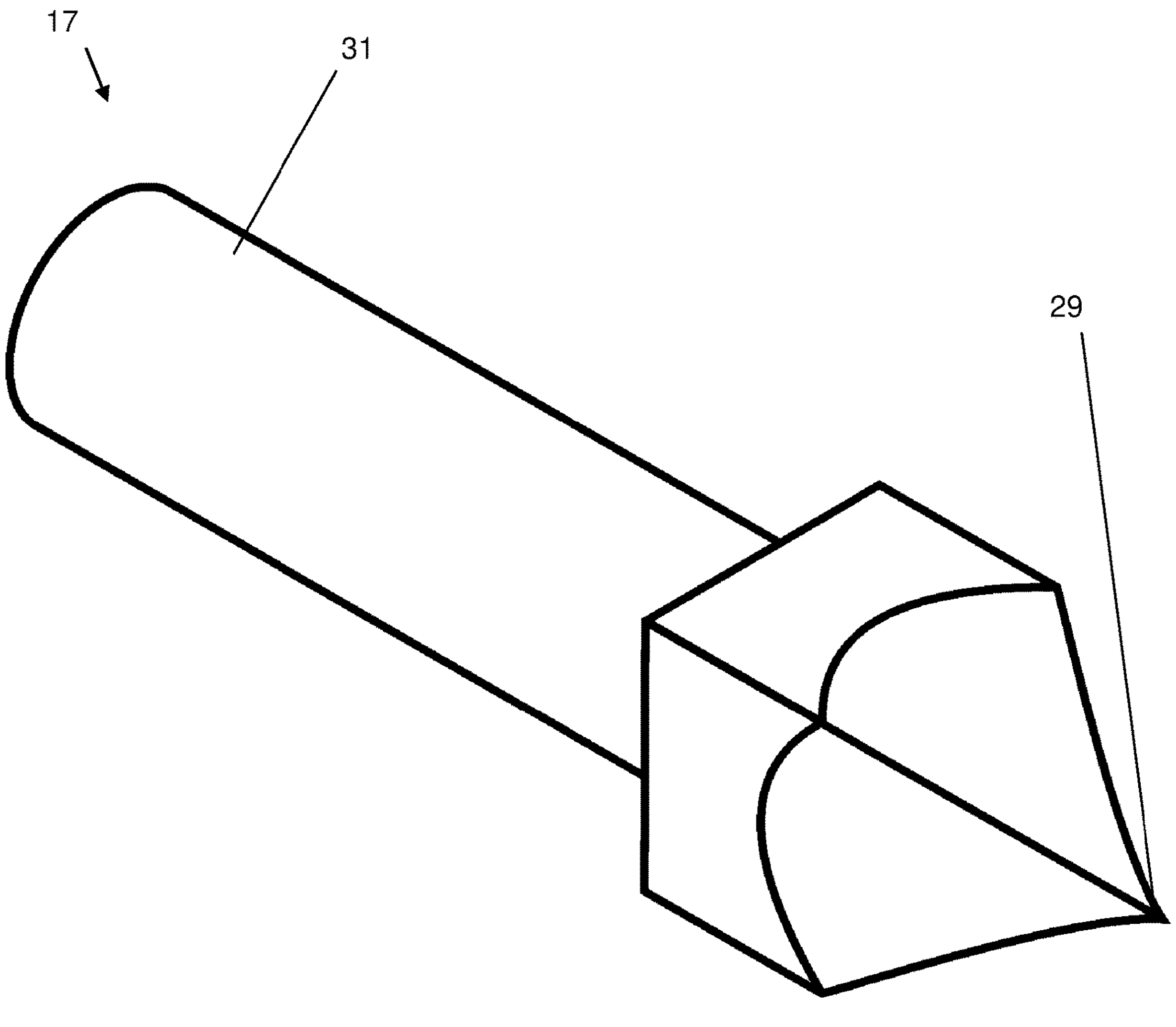
FIG. 35 is a perspective view of a piercing tool of the extraction device assembly of FIG. 1.
Figure 36:
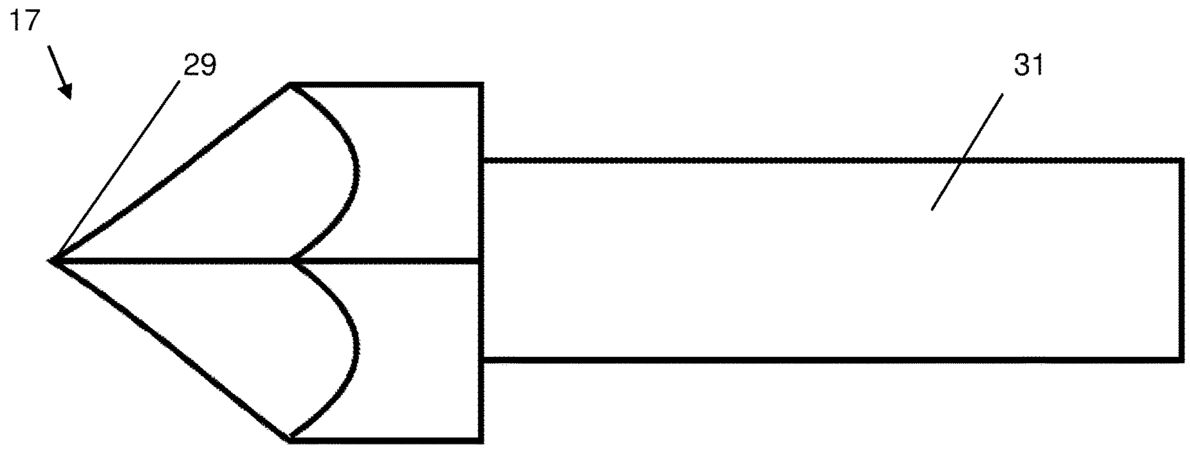
FIG. 36 is a first side view of a piercing tool of the extraction device assembly of FIG. 1.
Figure 37:
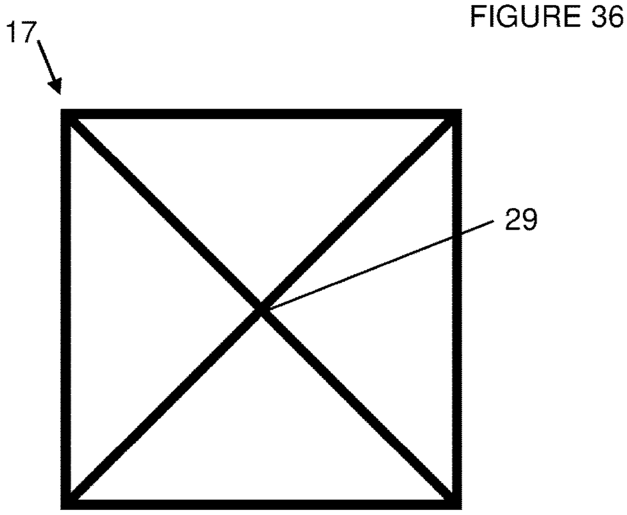
FIG. 37 is a front view of a piercing tool of the extraction device assembly of FIG. 1.
Figure 38:
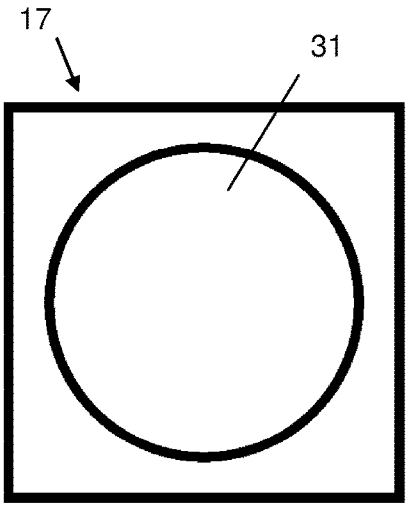
FIG. 38 is a rear view of a piercing tool of the extraction device assembly of FIG. 1.
Figure 39:
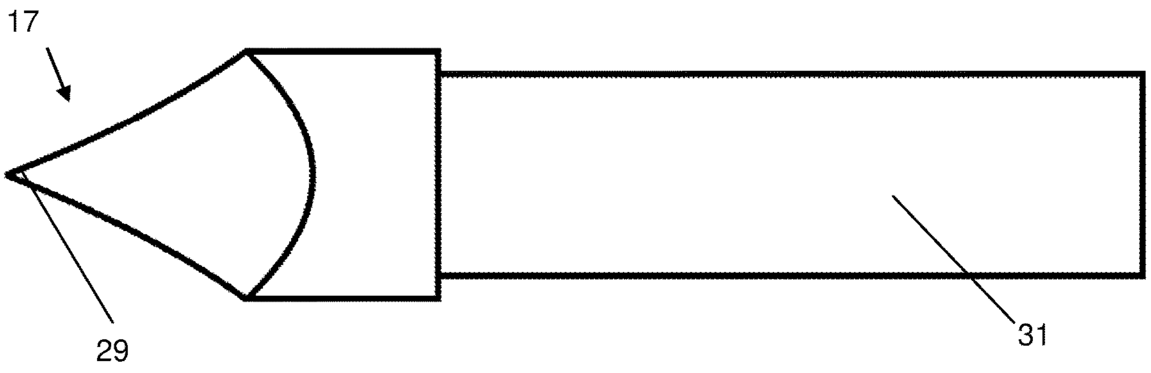
FIG. 39 is a second side view of a piercing tool of the extraction device assembly of FIG. 1.

FIG. 1 illustrates the piercing tool (17) angled and lined up with the cartridge interface aperture (11) as it will be pushed into and guided through the cartridge interface aperture (11). FIGS. 3, 4 and 5 illustrate the piercing tool (17) lodged into the collection interface aperture (15). FIG. 11 shows a front view of the tip (29) lodged into the collection interface aperture (15). FIGS. 35 to 39 illustrate different views of the piercing tool (17).

The nucleic acid amplification cartridge (5) may be a GeneXpert™ nucleic acid amplification cartridge for use in GeneXpert™ systems. The GeneXpert™ cartridge includes a sample-containing chamber which extends out of a front side of the cartridge. The sample-containing chamber is typically of a flat, rectangular or square in shape with a pointed distal end, as is illustrated in the accompanying Figures of the exemplary embodiment. In any embodiment in which the nucleic acid amplification cartridge is a GeneXpert™ cartridge, the cartridge interface apertures will have substantially rectangular or square shapes, corresponding to the shape of the GeneXpert sample-containing chamber. The piercing tool will therefore have a pyramid-shaped tip with a rectangular or square concave shape substantially corresponding to the shape of the GeneXpert™ sample-containing reaction chamber.

Figure 40:
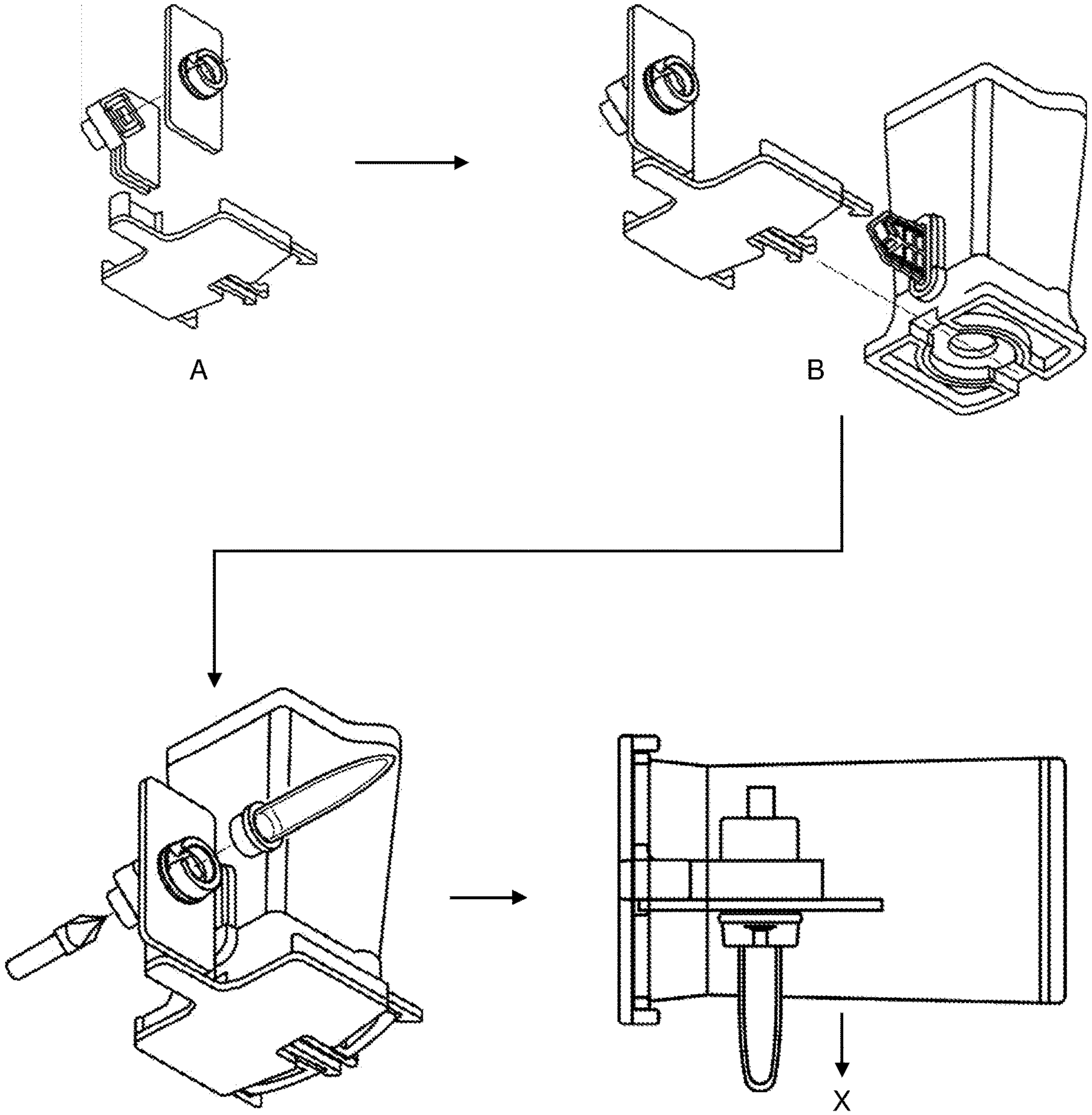
FIG. 40 is a flow diagram of an extraction device assembly in use with a nucleic acid amplification cartridge.

FIG. 40 illustrates a sequence of the use of the extraction device assembly. The extraction device assembly should be used in a sterile environment to limit chances of cross-contamination. Therefore, all surfaces, as well as the GeneXpert™ cartridge, should be cleaned with the likes of isopropyl alcohol prior to extraction. All components of the extraction device assembly should also be sterilised in a similar manner. As the GeneXpert™ cartridge includes an exposed top surface, this surface should be covered with a suitably size piece of parafilm, or any other suitable material, prior to the extraction.

The extraction device assembly (1) is first assembled, prior to use. This entails connecting the cartridge interface (7) and the collection interface (13) to the base (25), as illustrated in step A.

The GeneXpert cartridge (5) is connected onto the base (25) such that the claws (27) of the base grip tightly onto the cartridge (5), as is illustrated in step B. A reaction tube (23) is then connected to the tube connector (21) of the collection interface (13), as is shown in step C. The extraction device assembly (1), together with the cartridge (5) is tilted onto their side, and the piercing tool (17) is pressed into the cartridge interface aperture (11) by hand and guided through the cartridge interface aperture (11). The operator applies pressure by hand onto the back of the shaft (31) of the piercing tool (17), in a downwards direction (X), to break through the sample-containing chamber (3) and lodge into the collection interface aperture (15), illustrated in step D.

The collection interface (13) is then removed from the assembly (1) by sliding the lodged piercing tool (17) through the cartridge interface aperture (11). Whilst an operator grips the piercing tool (17) together with the collection interface (13) and the reaction tube (23), these components should be given an up-and-down shake to encourage sample material to flow downwards into the bottom of the reaction tube (23), in the direction indicated as X. The reaction tube (23) can then be removed from the tube connector (21) and centrifuged to ensure all sample material is in the bottom of the reaction tube (23).

Following extraction, the components of the extraction device (1) can then be discarded to minimize contamination of the environment with genomic material.

Figure 41:
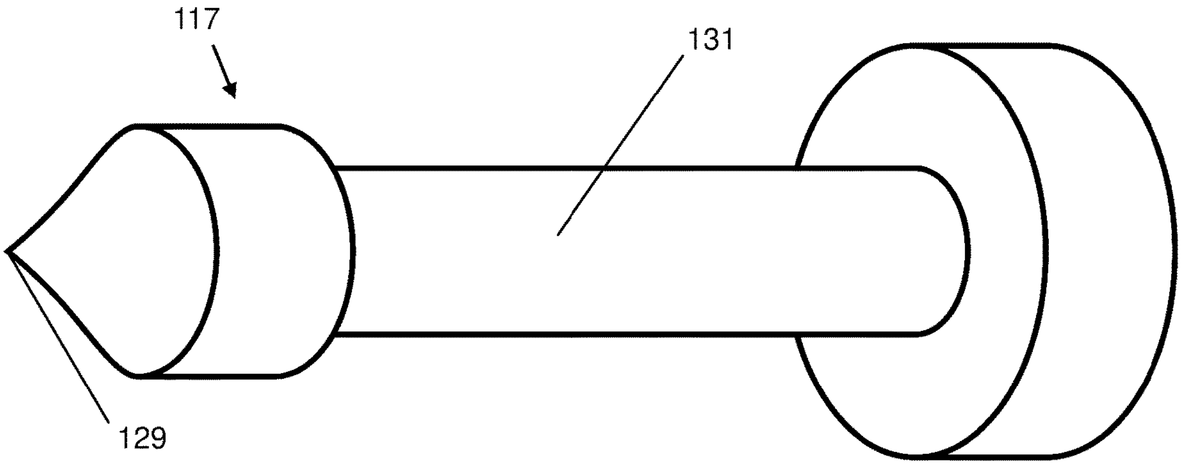
FIG. 41 is a perspective view of a second embodiment of the piercing tool of an extraction device assembly having circular apertures.
Figure 42:
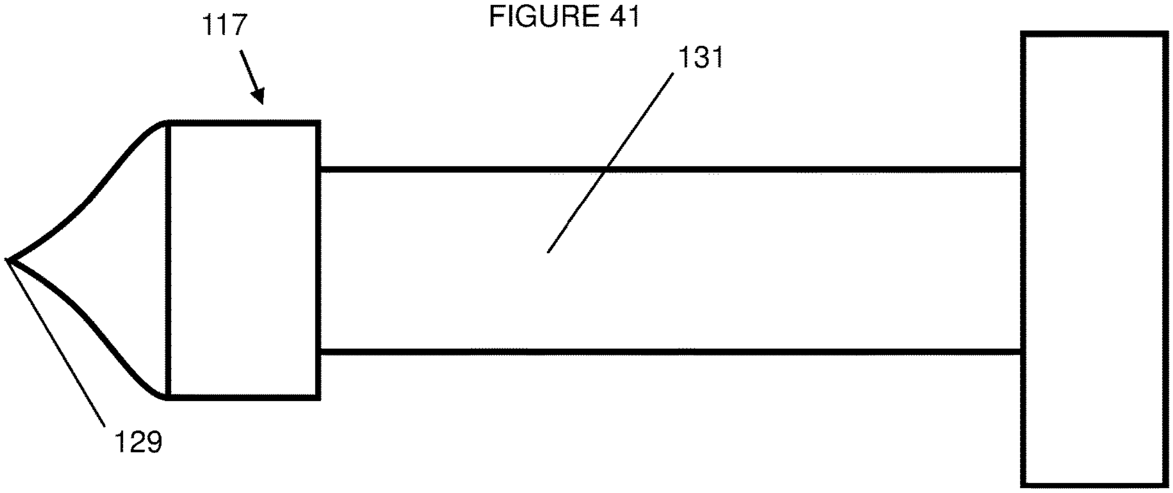
FIG. 42 is a side view of the piercing tool of FIG. 41.
Figure 43:
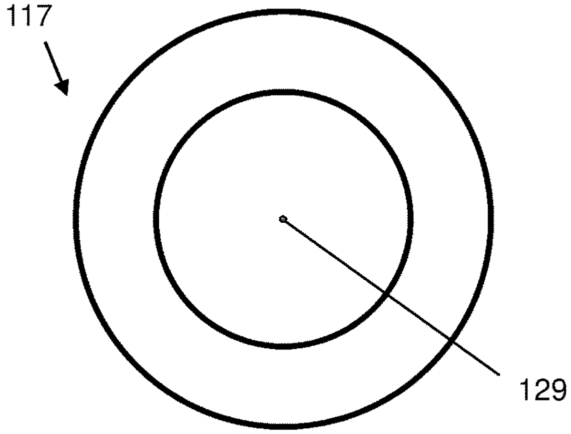
FIG. 43 is a front view of the piercing tool of FIG. 41.
Figure 44:
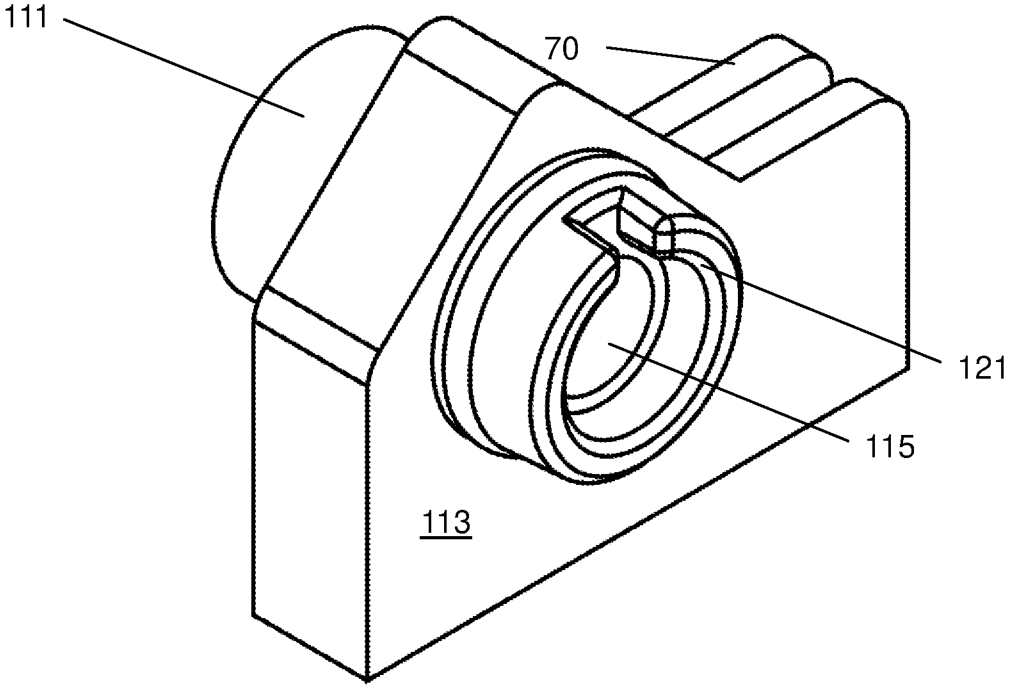
FIG. 44 is a perspective view of a second embodiment of a cartridge interface of an extraction device assembly having circular apertures.
Figure 45:
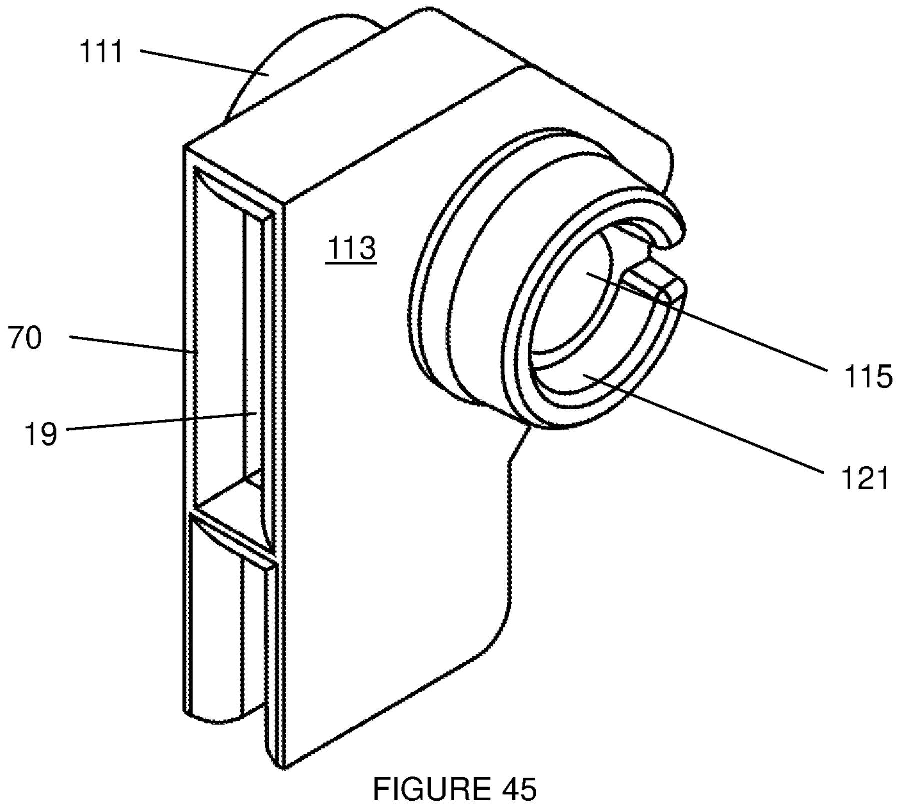
FIG. 45 is a perspective view of the cartridge interface of FIG. 44.
Figure 46:
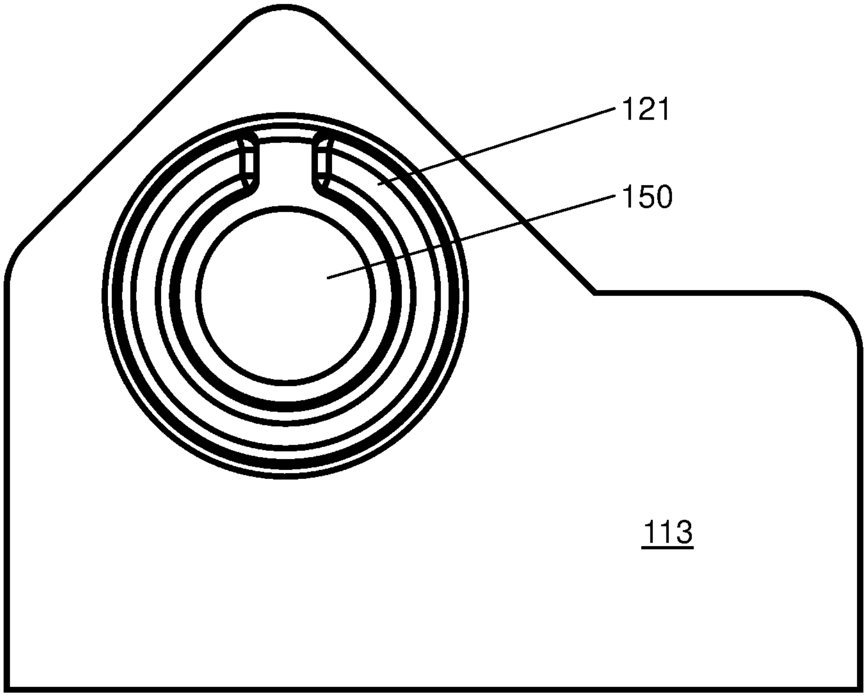
FIG. 46 is a first side view of the cartridge interface of FIG. 44.
Figure 47:
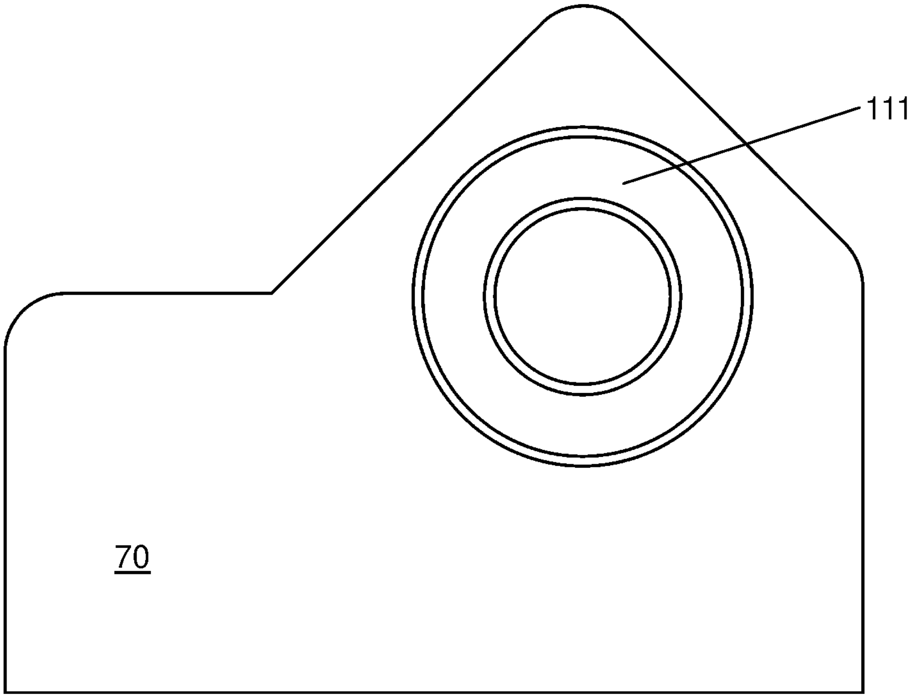
FIG. 47 is a second side view of the cartridge interface of FIG. 44.
Figure 48:
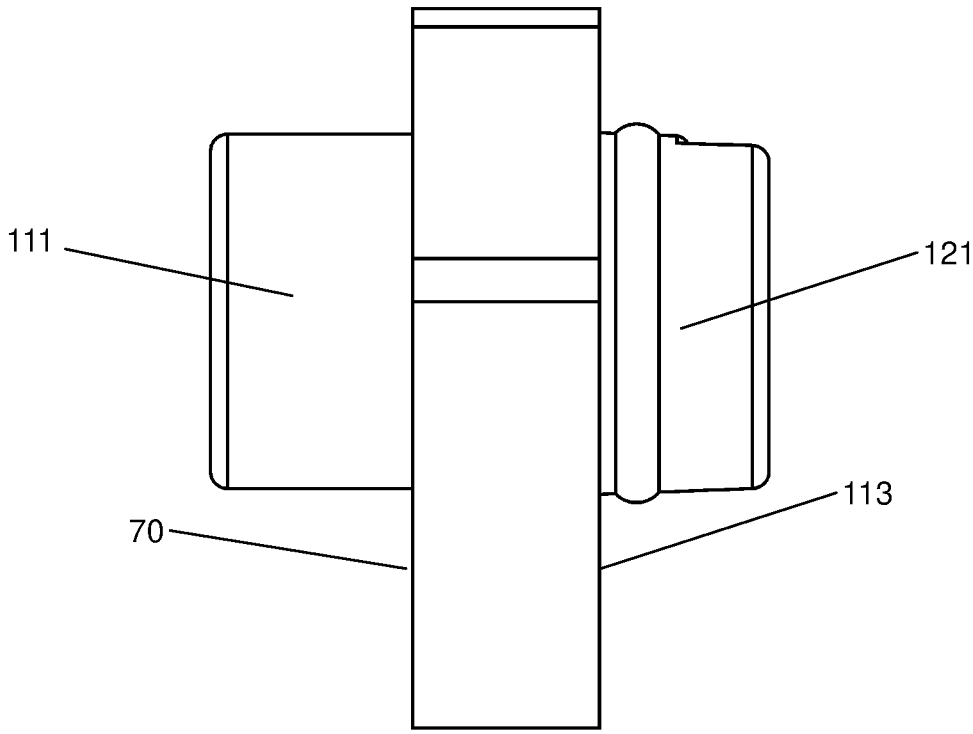
FIG. 48 is a front view of the cartridge interface of FIG. 44.
Figure 49:
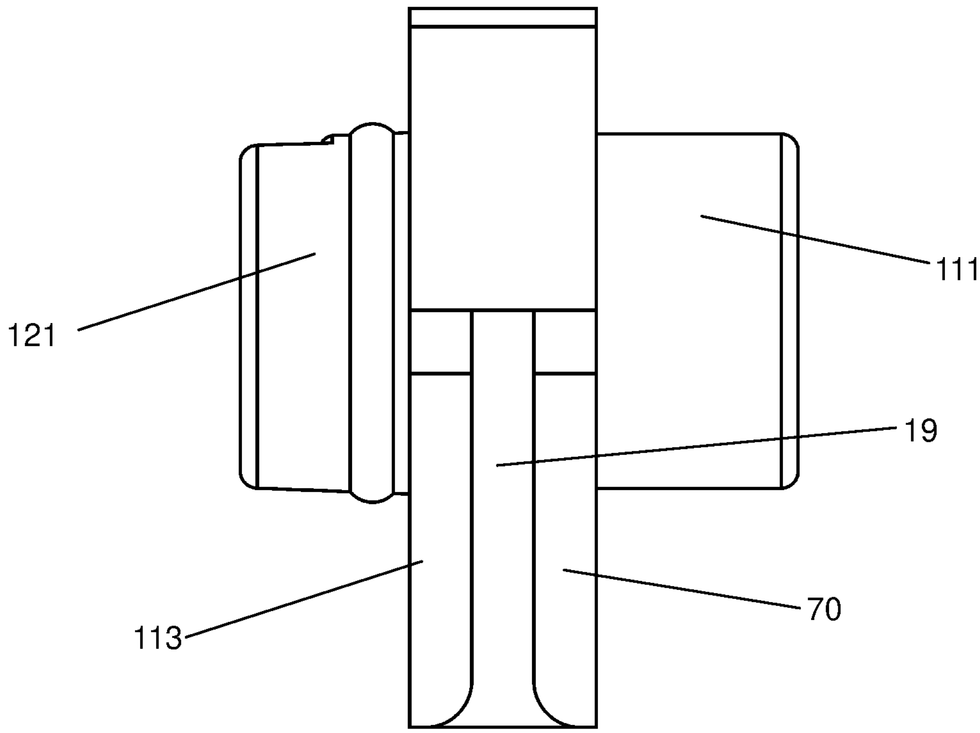
FIG. 49 is a rear view of the cartridge interface of FIG. 44.
Figure 50:
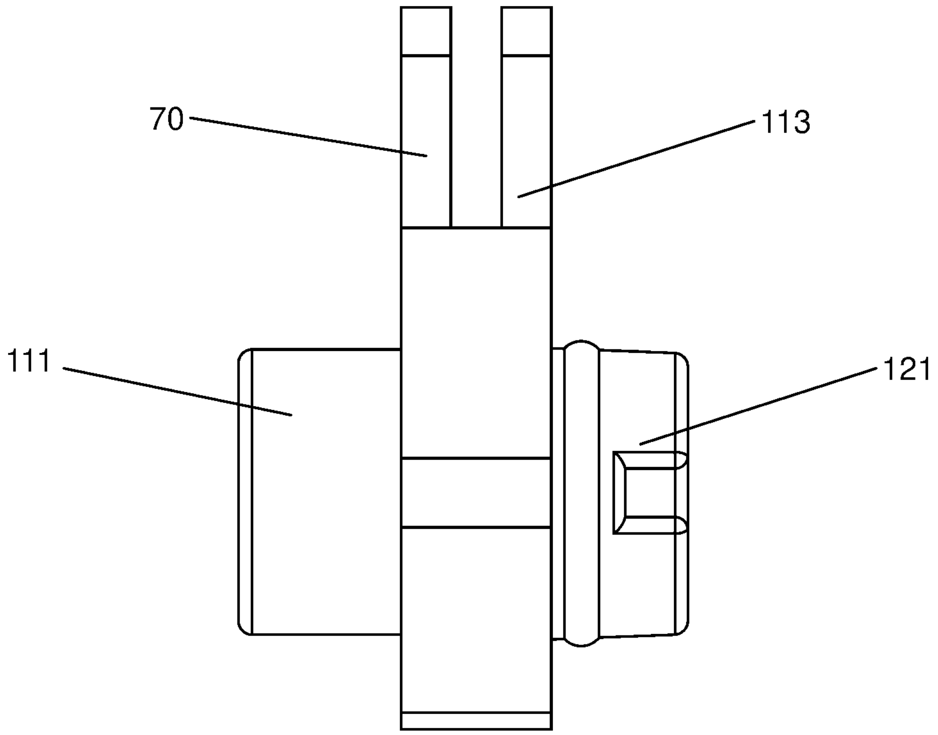
FIG. 50 is a top view of the cartridge interface of FIG. 44.
Figure 51:
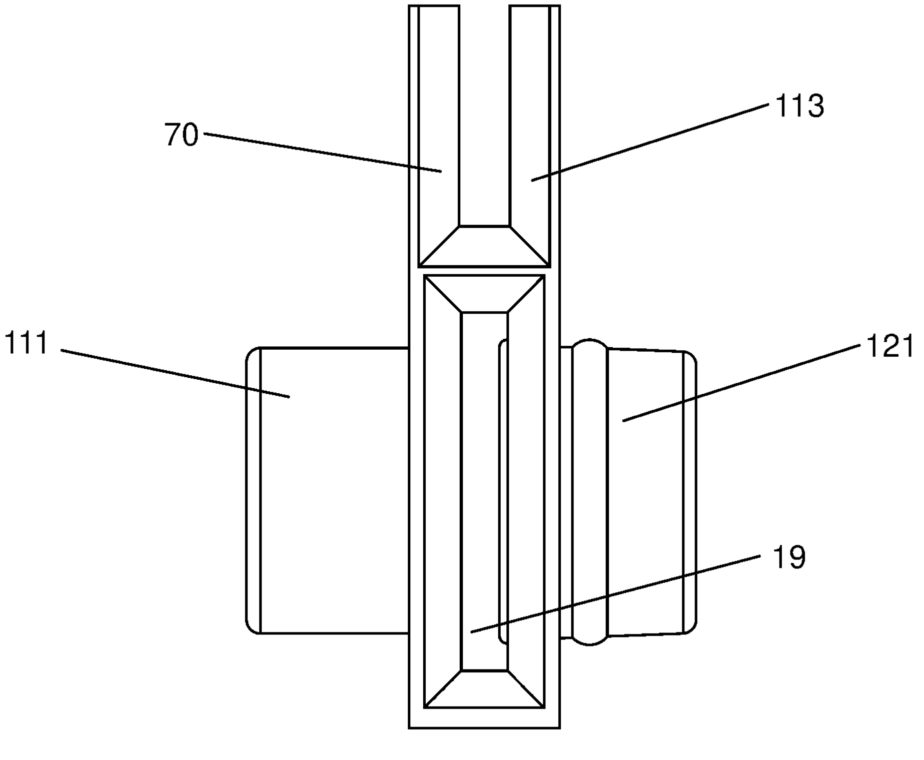
FIG. 51 is a bottom view of the cartridge interface of FIG. 44.
Figure 52:
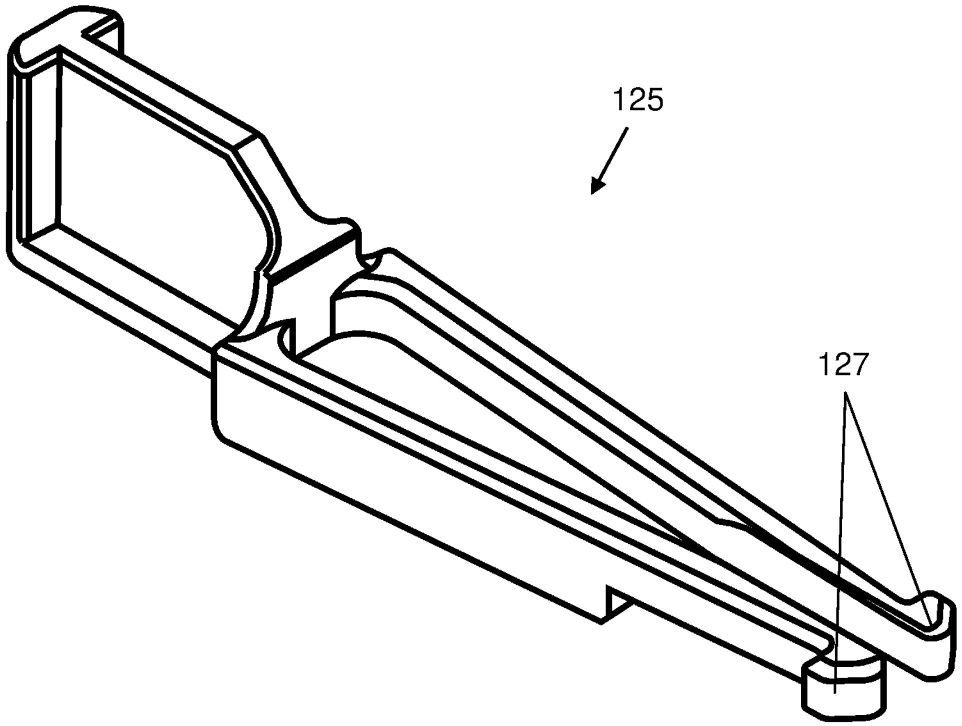
FIG. 52 is a perspective view of a second embodiment of a base of an extraction device assembly.
Figure 53:
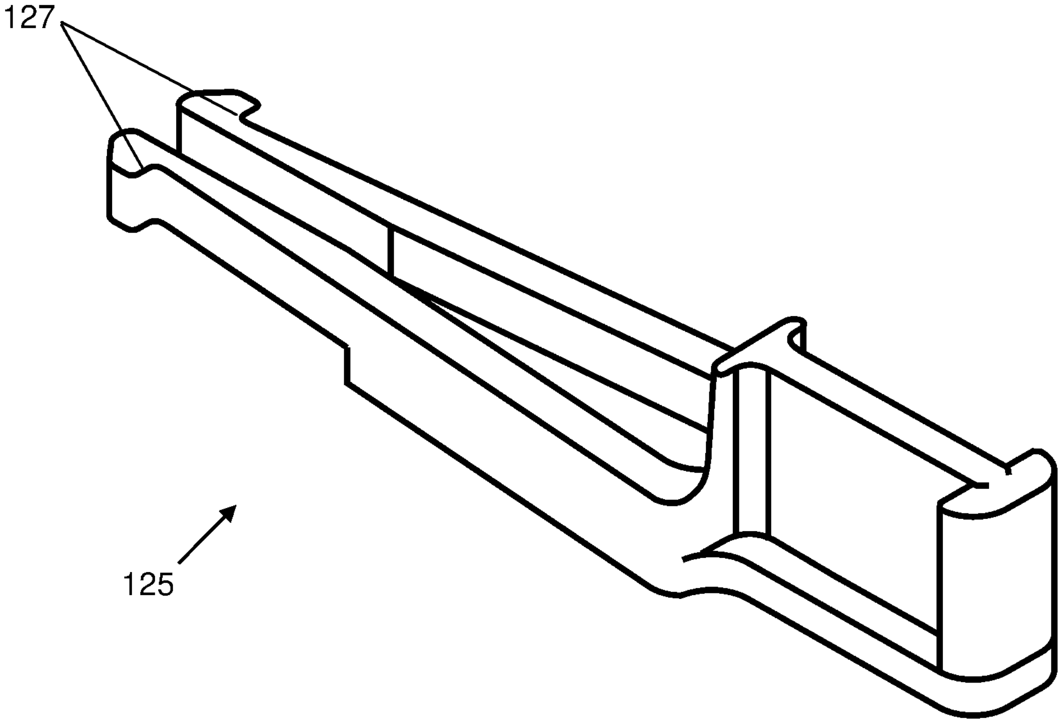
FIG. 53 is a perspective view of the base of FIG. 52.
Figure 54:
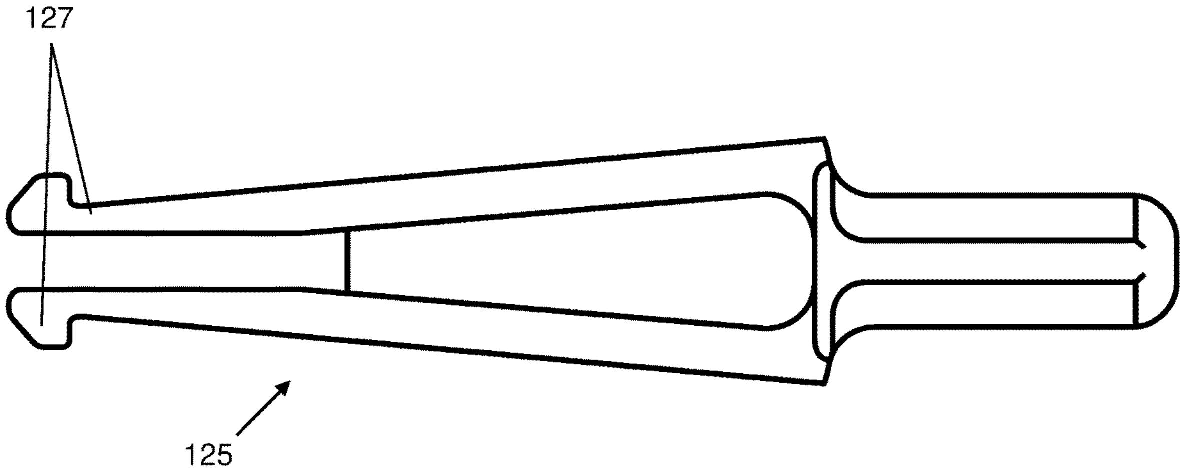
FIG. 54 is a top view of the base of FIG. 52.
Figure 55:
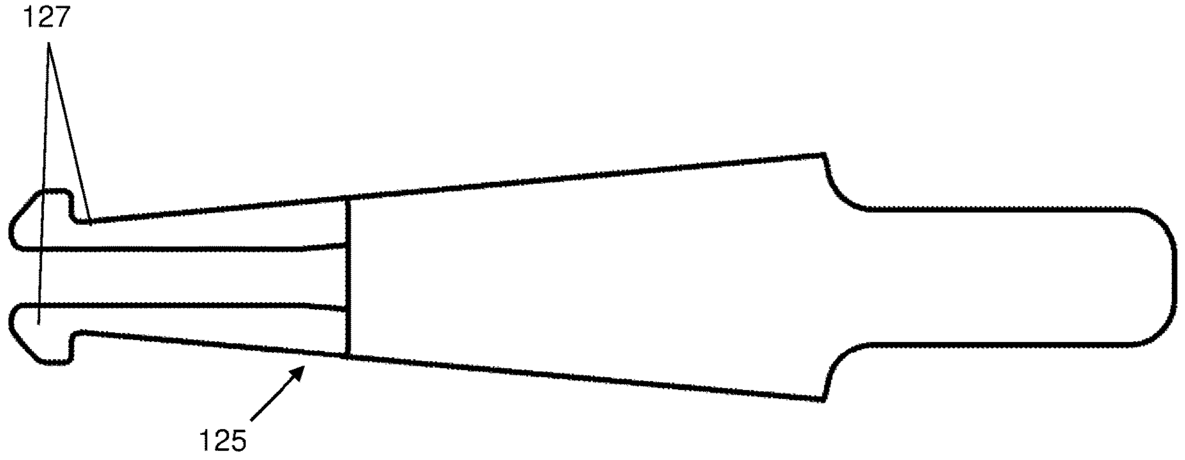
FIG. 55 is a bottom view of the base of FIG. 52.

FIGS. 41 to 43 illustrate an alternative embodiment of a piercing tool (117) having a tip (129) formed by a cone-like shape and a circular base. The face of the cone is concave, which may promote effective liberating of a sample from the sample-containing chamber. The shaft (131) has a width smaller than that of the tip (129). This piercing tool (117) is configured to be used with components of an alternative embodiments of an extraction device assembly having round apertures, where the embodiment of FIG. 1 has substantially square apertures.

FIGS. 44 to 51 illustrate another example embodiment of an extraction device assembly or, more particularly, of the components that, when assembled, form such an assembly. The aforementioned parts include an integrally formed cartridge interface (70) and collection interface (113), whereas the cartridge interface and collection interface were separate components in the assembly of FIG. 1. The cartridge interface (70) provides a tube connector (115) with a round collection interface aperture (121). The cartridge interface (70) includes a round cartridge interface aperture (111) that is aligned with the collection interface aperture (121). A receptacle (19) separates the collection interface aperture (121) of tube connector (115) from the cartridge interface aperture (111) of the cartridge interface (70). The receptacle (19) is configured to allow the sample-containing chamber of the cartridge to be fitted or cradled therein. When the sample-containing chamber is fitted into the receptacle (19), the cartridge interface aperture (111) aligns with the sample-containing chamber as well as with the collection interface aperture (121) to at least partially expose the sample-containing chamber The piercing tool (117) of FIGS. 41 to 43 is complementarily shaped to the cartridge interface aperture (121) of the of the cartridge interface (70) shown in FIGS. 44 to 51 enabling it to pass therethrough. These alternative embodiments may find particular application with a cartridge that may have a circular sample containing chamber.

Another example embodiment of a base (125) is shown in FIGS. 52 to 55. The base (125) includes two claws (127) arranged adjacent to one another on one side of the base (125). This embodiment of the base (125) may require less material to manufacture.

The extraction device assembly therefore allows a processed sample of a nucleic acid amplification cartridge, which would previously have merely been discarded, to be used in further downstream applications. The assembly allows for the aseptic extraction of the sample from the cartridge, which prevents any pathogens from being released from the sample, or any material cross-contaminating the sample.

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention set forth in any accompanying claims.

Finally, throughout the specification and any accompanying claims, unless the context requires otherwise, the word 'comprise' or variations such as 'comprises' or 'comprising' will be understood to imply the inclusion of a stated integer or group of integers but not the exclusion of any other integer or group of integers.

The invention claimed is:

1. An extraction device assembly for extracting a sample from a sample-containing chamber of a nucleic acid amplification cartridge, the assembly comprising:

a cartridge interface forming a receptacle configured to at least partially fit the sample-containing chamber therein, the cartridge interface having a cartridge interface aperture configured to at least partially expose the sample-containing chamber when fitted in the receptacle; and a collection interface having a collection interface aperture configured to at least partially align with the cartridge interface aperture with the sample-containing chamber positioned at least partially between the cartridge interface aperture and collection interface aperture when fitted in the receptacle, wherein the collection interface aperture is in fluid communication with a collector, wherein the extraction device assembly is operable to fit the sample-containing chamber in the receptacle of the cartridge interface and guide a piercing tool into the cartridge interface aperture to pierce the sample-containing chamber and liberate a sample contained therein such that the liberated sample is transferred to the collector;

wherein the sample containing chamber is an output chamber of the nucleic acid amplification cartridge that is configured to receive a processed and amplified sample; and wherein the collector comprises a tube connector arranged to secure a polymerase chain reaction (PCR) tube or a microcentrifuge tube thereto such that the liberated sample feeds into and is collected by the PCR tube or the microcentrifuge tube via the collector.

2. The extraction device assembly of claim 1, wherein the tube connector is arranged to releasably secure the PCR tube or the microcentrifuge tube thereto such that the liberated sample feeds into and is collected by the PCR tube or the microcentrifuge tube via the collector.

3. The extraction device assembly of claim 2, wherein the tube connector is arranged to releasably secure the microcentrifuge tube or the PCR tube thereto having a capacity of between 0.1 mL and 0.5 mL.

4. The extraction device assembly of claim 1, wherein the cartridge interface and collection interface are separate components, and wherein the extraction device assembly further includes a base configured to removably secure the cartridge interface and collection interface thereto at assigned securing positions.

5. The extraction device assembly of claim 4, wherein the base is configured to be secured to the nucleic acid amplification cartridge, with the securing positions for the cartridge interface and collection interface being positioned such that the sample-containing chamber fits into the receptacle when the base is secured to the cartridge.

6. The extraction device assembly of claim 4, wherein the base includes at least one claw arranged to grip onto the cartridge when the base is secured to the cartridge.

7. The extraction device assembly of claim 1, further comprising a piercing tool with a tip complementarily shaped to the cartridge interface aperture enabling it to pass there through, and having a shaft with a smaller width than the tip, wherein a shape of the tip forms a complementary fit with the collection interface aperture, wherein the assembly is operable to fit the sample-containing chamber in the receptacle of the cartridge interface, to guide the piercing tool through the cartridge interface aperture to pierce the sample-containing chamber and lodge in the collection interface aperture to at least partially conceal the contaminated tip, to liberate a sample contained therein such that the liberated sample is collected into the PCR tube or the microcentrifuge tube, and to remove the collection interface and piercing tool lodged therein from the assembly with the shaft of the piercing tool passing through a hole in the cartridge formed by the tip.

8. The extraction device assembly of claim 7, wherein the piercing tool has a substantially cone-shaped tip with concave sides, with the base of the cone-shaped tip having a circular shape substantially corresponding with that of the sample-containing reaction chamber.

9. The extraction device assembly of claim 7, wherein the piercing tool has a substantially pyramid-shaped tip, with the base of the pyramid-shaped tip having a rectangular shape substantially corresponding with that of the sample-containing reaction chamber.

10. The extraction device assembly of claim 9, wherein the substantially pyramid-shaped tip of the piercing tool has four faces corresponding to the four sides of the rectangular-shaped base.

11. The extraction device assembly of claim 10, wherein the four faces have concave surfaces.

12. The extraction device assembly of claim 1, wherein the cartridge interface apertures are shaped to correspond to a shape and sidewalls of the sample-containing reaction chamber that protrudes from the nucleic acid amplification cartridge.

13. The extraction device assembly of claim 1, wherein the cartridge interface aperture has a substantially rectangular shape that substantially corresponds to a shape of sidewalls of the sample-containing reaction chamber that protrudes from the nucleic acid amplification cartridge.

14. The extraction device assembly of claim 1, wherein the cartridge interface aperture has a substantially circular shape that substantially corresponds to a shape of sidewalls of the sample-containing reaction chamber that protrudes from the nucleic acid amplification cartridge.

* * * * *